March 23, 1954 A. L. W. WILLIAMS 2,673,040

MAGNETIC RECORDING AND REPRODUCING APPARATUS

Filed Oct. 28, 1947

7 Sheets-Sheet 1

INVENTOR.
A.L.W. WILLIAMS
BY Eber J. Hyde
ATTORNEY

INVENTOR.
A.L.W. WILLIAMS
BY
A. Pinelli
ATTORNEY

March 23, 1954 A. L. W. WILLIAMS 2,673,040

MAGNETIC RECORDING AND REPRODUCING APPARATUS

Filed Oct. 28, 1947 7 Sheets-Sheet 3

INVENTOR.
A.L.W. WILLIAMS

BY [signature]

ATTORNEY

March 23, 1954 A. L. W. WILLIAMS 2,673,040

MAGNETIC RECORDING AND REPRODUCING APPARATUS

Filed Oct. 28, 1947 7 Sheets-Sheet 4

INVENTOR.
A.L.W. WILLIAMS

BY

ATTORNEY

March 23, 1954 A. L. W. WILLIAMS 2,673,040

MAGNETIC RECORDING AND REPRODUCING APPARATUS

Filed Oct. 28, 1947 7 Sheets-Sheet 5

INVENTOR.
A.L.W. WILLIAMS

BY A. Pirello

ATTORNEY

March 23, 1954 A. L. W. WILLIAMS 2,673,040

MAGNETIC RECORDING AND REPRODUCING APPARATUS

Filed Oct. 28, 1947 7 Sheets-Sheet 6

INVENTOR.
A. L. W. WILLIAMS
BY [signature]
ATTORNEY

March 23, 1954 A. L. W. WILLIAMS 2,673,040

MAGNETIC RECORDING AND REPRODUCING APPARATUS

Filed Oct. 28, 1947 7 Sheets-Sheet 7

INVENTOR.
A. L. W. WILLIAMS
BY [signature]
ATTORNEY

Patented Mar. 23, 1954 2,673,040

UNITED STATES PATENT OFFICE 2,673,040

MAGNETIC RECORDING AND REPRODUCING APPARATUS

Alfred L. W. Williams, Cleveland Heights, Ohio, assignor, by mesne assignments, to Clevite Corporation, Cleveland, Ohio, a corporation of Ohio Application October 28, 1947, Serial No. 782,491

5 Claims. (Cl. 242—54)

This invention relates to magnetic recording and reproducing apparatus, and more particularly it relates to such apparatus that utilizes as a magnetic recording medium a flexible magnetic record member, such as a wire, filament, or tape, which may be stored on reels and transferred between reels while the magnetic recording and the reproducing operations are performed.

Among the objects of the invention are to provide novel magnetic recording apparatus of the foregoing type, embodying various features of construction which make the apparatus simple and economical in design and construction and which make the apparatus foolproof and eliminate difficulties heretofore encountered in such apparatus; and further to provide a relatively closely coupled device in which the various elements and components are relatively closely disposed so they occupy a minimum of space and enable the weight of the apparatus to be reduced to a minimum.

Some further objects of the invention are to provide a driving system with proper and adequate safeguards against stresses on the record member that might cause it to break; to provide a system for controlling and equalizing the tension in the record member during its transfer between reels; and to provide simple indicator means showing the extent of used space and of available record space on the record member.

The foregoing and other objects of the invention will be best understood from the following description of various exemplifications of the features of the invention, reference being had to the accompanying drawings wherein.

Figures 9, 10, 10A:
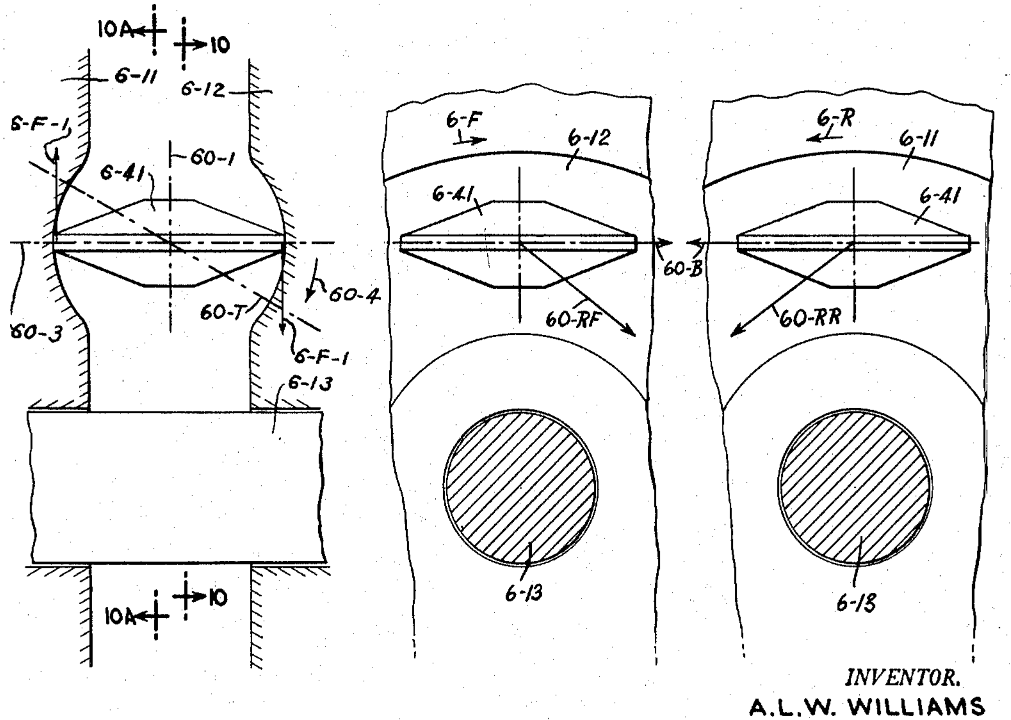
Figure 7:
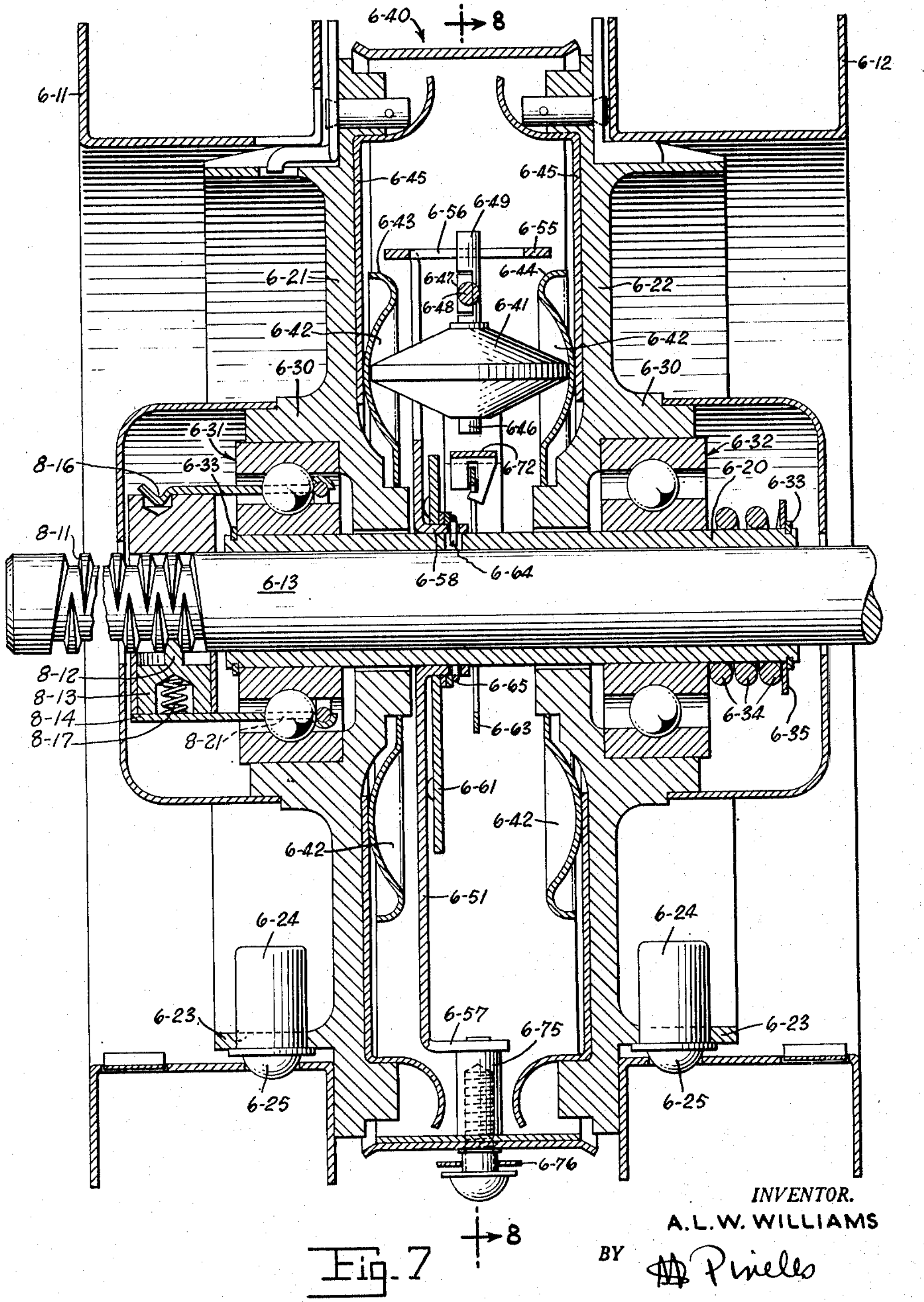
Fig. 7 is a sectional view of a practical form of a modified magnetic record transducer exemplifying the invention, taken along the line 7—7 of Fig. 8.
Figures 8, 8A:
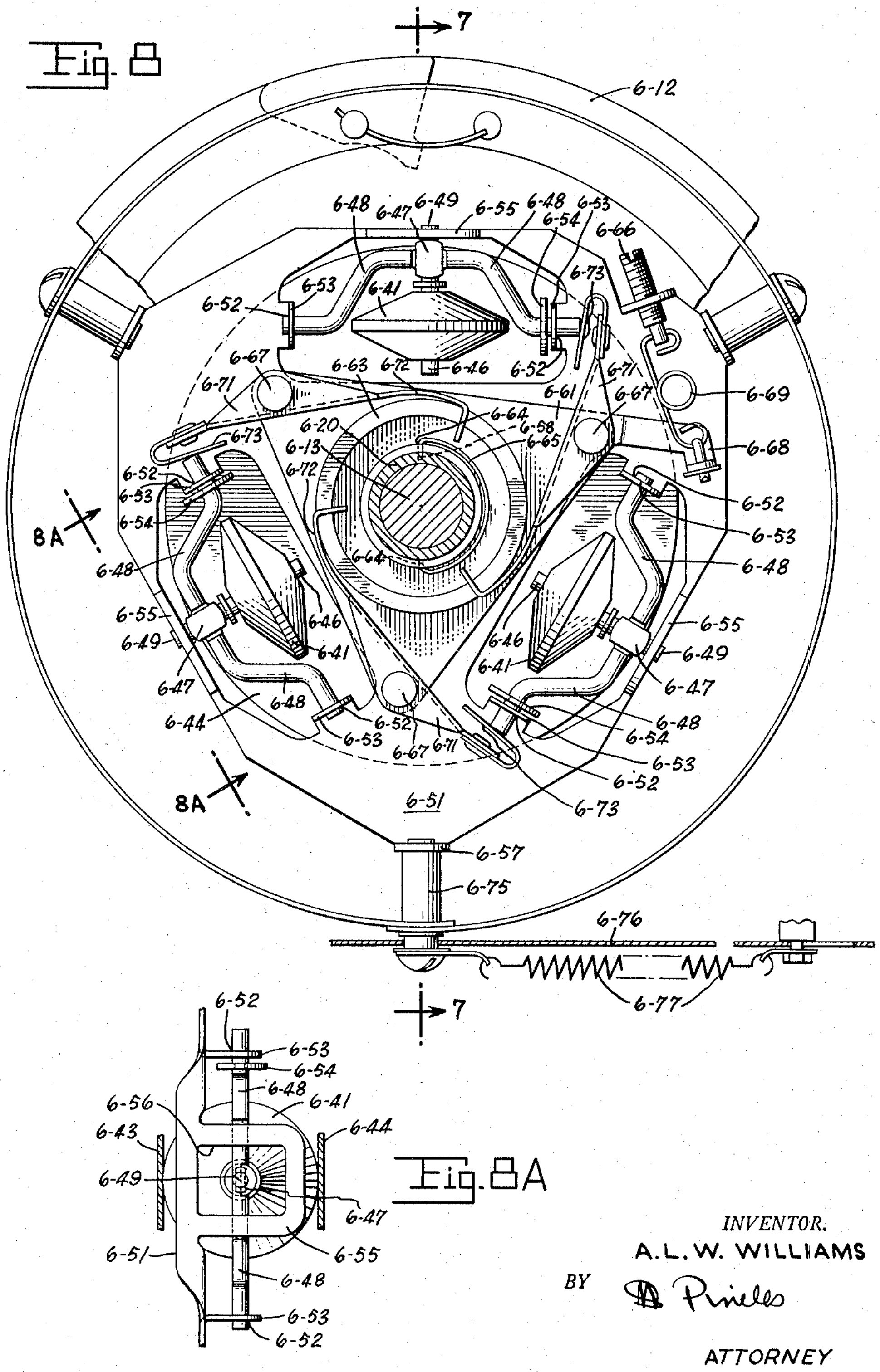
Fig. 8 is a sectional view of the magnetic record transducer structure of Fig. 7, taken along the line 8—8.

Fig. 8-A is a detail view along line 8-A—8-A of Fig. 8;

Fig. 9 is a schematic view similar to Fig. 7 diagrammatically indicating the operation of the form of the invention shown in Figs 7 to 8-A; and Figs. 10 and 10-A are diagrammatic views, taken along lines 10—10 and 10-A—10-A, respectively, of Fig. 9, showing further explanatory details of the invention.

Figure 1:
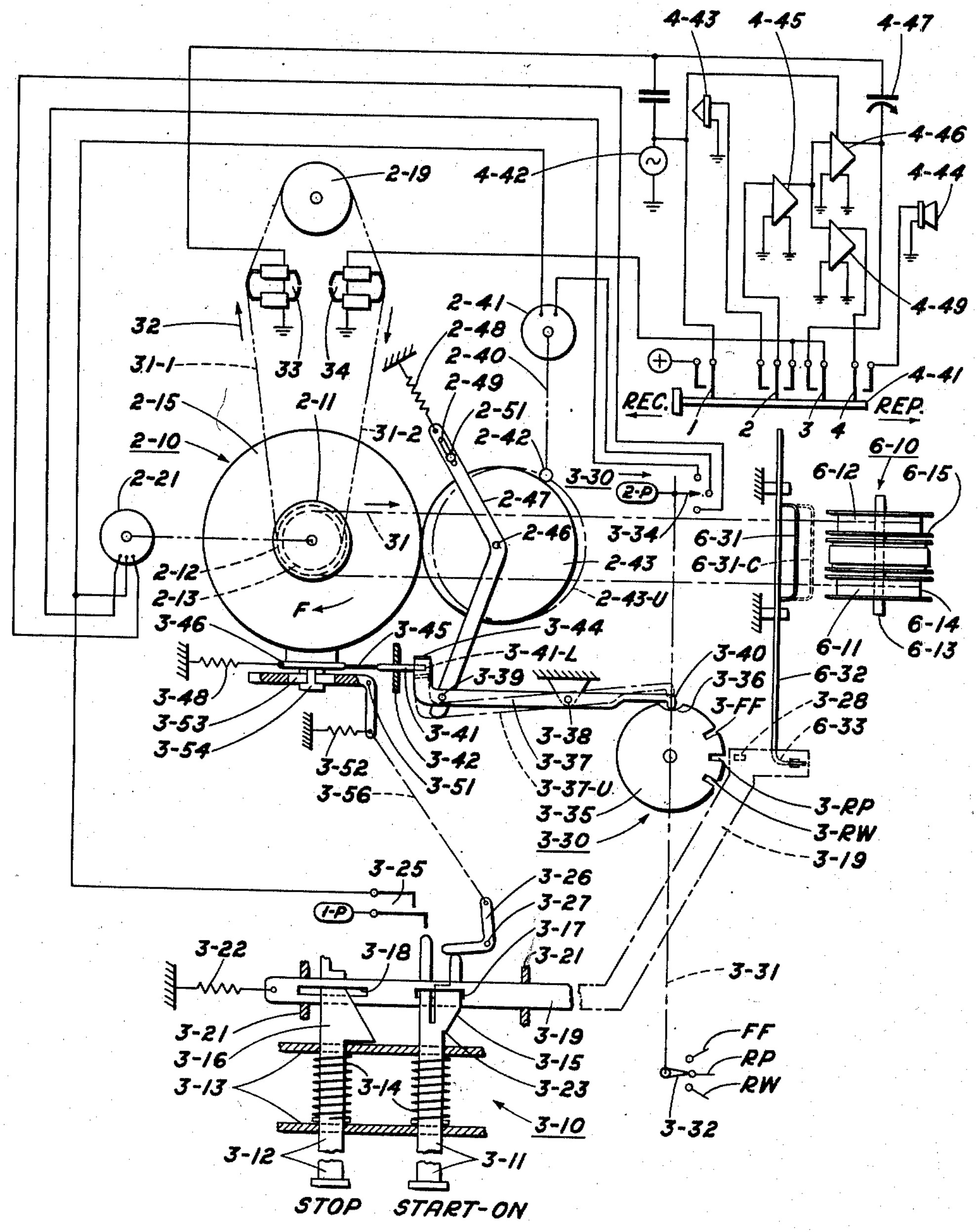
Fig. 1 is a simplified diagrammatic view illustrating the general relationship of the mechanical, magnetic and electric elements of a magnetic recording and reproducing apparatus exemplifying one form of the invention.

Fig. 1 illustrates in a simplified diagrammatic manner the general relationship of the mechanical, magnetic and electric elements of a magnetic recording and reproducing apparatus exemplifying one form of the invention. In general, it comprises a driving mechanism 2-10, a control mechanism 3-10 and a reeling mechanism 6-10 arranged to reel and guide a long flexible magnetic record member 31, such as a filament, wire or tape stored on two reels 6-11, 6-12, along a path indicated by dash-double-dot lines, either in forward direction 32 during a recording or playback operation, or in the opposite rewinding direction for rewinding the recording medium on reel 6-11 before another recording or playback operation. A magnetic erasing head indicated at 33 and a magnetic record transducing head 34 are located along the path of the motion of the record member 31 for either recording magnetic signals on the magnetic recording medium by the operation of the record transducing head 34 or for playing back recorded signals by the operation of the record transducing head 34 as a playback head, while the record member 31 is impelled in the forward direction 32 or for erasing recorded signals by operation of the erasing head 33.

To simplify the description of the features of the invention, a slow speed reeling operation in the forward direction of the arrow 32 will be designated as a normal forward reeling operation during which the record medium is reeled from reel 6-11 operating as a supply reel past the erasing head 33 and the transducing head 34 on to reel 6-12 which operates as a take-up reel, the two reels being for convenience designated as the supply and take-up reel although during a rewinding operation, take-up reel 6-12 operates as a supply reel and supply reel 6-11 operates as a take-up reel.

During the magnetic recording process, each element of the record member 31 passes successively first past the pole gap region of the magnetic erasing head 33 and then past the pole gap region of the record transducing head 34 operating as a recording head. The recording system shown in Fig. 1 is arranged to carry on magnetic recording and reproducing or playback operations under the control of a multiblade recording switch 4–41. The recording switch may be a standard multiblade switch which is shown operated manually by a knob from the neutral position shown either to the left for establishing the recording circuit connections or to the right side for establishing playback circuit connections.

When the recording switch 4–41 is in the left-hand recording position, its blades establish the following recording circuit connections: Contact blade 1 connects a source of high frequency oscillations 4–42 to a source of a positive power supply indicated by a plus (+) sign, the oscillation source 4–42 being shown connected to the coils of the erasing head 33 for supplying thereto high frequency erasing current of sufficiently large amplitude so that each longitudinal element of the moving magnetic record member 31 passing the gap region of the erasing head is subjected to an alternating flux strong enough to erase any previous magnetic signal records and restore the magnetic elements of the record member to a magnetically substantially-neutral condition. After being subjected to the magnetic erasing action by the erasing head 33, each element of the moving record member 31, upon reaching the pole gap region of the record transducing head 34, is subjected to a magnetic recording flux produced by the amplified signal currents which are to be recorded and a superimposed high frequency biasing flux component.

In Fig. 1, a conventionally shown microphone 4–43 serves as a source of signals which are to be recorded, and a loudspeaker 4–44 serves to reproduce the signals. During the recording operation, the microphone is connected by way of contact blade 2 in its left-hand position to the input side of a pre-amplifier 4–45, the output of which, after further amplification by an additional recording amplifier 4–46, is supplied to the coil windings of the record transducing head 34 through switch blade 3 of the recording switch 4–41 in its left-hand position, the circuits being completed through the ground connections shown.

The high frequency bias component of the recording flux is supplied by a high frequency current component derived from the oscillator 4–42 by a suitable circuit, such as shown, which includes an adjustable coupling condenser 4–47 for supplying an adjustable component of the high frequency oscillations to the output circuit of the amplifier 4–46 where it is mixed with the amplified signal currents supplied by the microphone 4–43 which are to be recorded. The coupling condenser 4–47 and the other circuit elements of the system are designed to mix a suitable component of the high frequency oscillations derived from the oscillator 4–42 with the amplified signal current supplied by the microphone in such manner as to produce in the gap region of the recording head 34 the desired combination of the signal recording flux and the superimposed high frequency biasing flux component.

To play back the signals magnetically recorded on the record member 31 while it moves in the same forward direction indicated by the arrow 32, the selector switch 4–41 is actuated to the right-hand playback position. In the right-hand reproducing or playback position of the recording switch 4–41, its blade 1 disconnects the positive supply source (+) from the oscillator 4–42 and the recording amplifier 4–46, thereby rendering them inoperative.

In addition, blade 2 of the selector switch 4–41, in its right-hand position, disconnects the input side of the pre-amplifier 4–45 from the microphone 4–43 and connects instead the windings of the record transducer head 34 to the input side of the amplifier 4–45, the output of which is now impressed on the additional playback amplifier 4–49, the output of which is supplied to the reproducer 4–44 by the switch blade 4 of the recording switch in its right-hand position, switch blade 3 now keeping open the circuit connection of the windings of the transducer head 34 to the recording amplifier 4–46.

The magnetizable record member may take various forms. It may be formed as a relatively thin wire of the order of .004 to .006 inch in diameter. It may, alternatively, take the form of a thin, narrow ribbon such as might by formed, for example, by flattening out such a thin wire. In other types of apparatus to which the principles of this invention are applicable, a relatively wide tape or sheet may be used as the record member. For example, the tape may be a quarter of an inch or more in width, although the apparatus shown herein is designed for a record member consisting of a long thin wire or a wire-like tape. Such thin magnetic record member may also be formed of a filamentary element of a non-magnetic material, for example, a fibrous or plastic thread, in which is disposed a magnetizable powder material, or which is coated with a layer of magnetizable material.

For proper operation of the recording and of the reproducing actions, the speed of movement of the record member should be constant as it moves past the record transducing head, by means of which the signals are to be recorded or subsequently to be reproduced. After a desired signal has been recorded upon a magnetic record member, the record may be reproduced by moving the record member at the same speed past the same or a similar transducer head of the same characteristics, that is connected during such reproducing operation, to appropriate amplifying and reproducing circuits.

Normally, the filament or wire record member is disposed in wound condition on a supply spool or reel. During the recording operation, the wire is unwound from the supply spool or reel onto a receiving or take-up spool or reel. Movement of the wire from one spool to the other may be effected in various ways. Where the wire is drawn onto a receiving reel by driving that reel, a problem is introduced in maintaining the tension of the wire constant, due to the fact that the wire is wound onto the receiving reel at varying distances from the center or axis of the reel. For satisfactory recording and reproducing operations, the speed of the recording wire should be constant, as was stated above. In order to maintain the movement of the wire at such constant speed, particularly past the recording head, the magnetic record wire is wound around a sheave, and the sheave is rotated at a constant speed by a motor to pull the wire from one reel and supply it to the other reel. The speed of the wire is thus maintained constant in its movement from the supply reel onto the take-up or receiving reel.

As it moves from the supply reel to the take-up reel, the magnetic record wire is moved past the recording magnetic head in such manner that the wire constitutes a moving armature continuously in contact with two magnetic pole pieces of the head. Those pole pieces are magnetized according to the impressed signals, and a continuous record is thus made on the wire of the varying magnetic conditions of the recording magnetic head as the wire passes the magnetic head.

During the recording operation or during a subsequent reproducing operation, the speed of the wire is relatively slow—of the order of a foot per second. After a recording operation has been performed, and it is desired to rewind the wire back from the take-up reel onto the original supply reel so that the wire may be moved forward again for reproducing or for playback operation, it is not necessary to move the wire at such a slow speed. To reel the wire back, it is, in fact, desirable to move the wire at a relatively fast speed so that as little time as possible need be consumed in rewinding the recorded wire from the take-up reel back onto the supply reel. A high reeling speed is also desirable whenever a particular portion of the record member containing a desired record is required.

It is, therefore, desirable under different conditions to be able to wind the wire at a high speed in the forward direction, as well as at a high speed in the backward direction. For that purpose, a high-speed motor driving connection is provided for the driving sheave for a high-speed operation in forward or in backward direction.

In the recording mechanism shown, a separate motor is employed for reeling the recording member during the relatively slow recording and playback operations. A relatively slow driving force is derived from that motor by a speed-reducing and filtering system comprising a relatively-large, rubber-tired idler coupling pulley through which the motor shaft imparts the desired constant slow speed to a capstan roller or sheave which drives the wire.

In order to perform a fast reeling operation, the wire-driving sheave is driven directly at high speed by another motor rotating at high speed in either direction. Suitable safeguards are also provided to prevent simultaneous application of driving forces to the wire-driving sheave from both motors.

For that purpose, both electrical and mechanical inter-locking arrangements are provided. By an electrical interlocking arrangement, electrical driving energy is supplied to only one motor at a time. At the same time, the mechanical parts are controlled to prevent a mechanical driving connection between one motor and the sheave whenever the other motor is energized or coupled thereto.

When a magnetic record wire is wound onto the take-up reel or spool, or back onto the supply reel, it is desirable to control the winding of the wire onto either reel so it will tend to wind in layers instead of piling up all in one region on the reel that is the collecting or receiving reel for that operation.

To provide for such layer winding, or level winding, the two reels are mounted as part of a movable unit on a supporting shaft, and the unit is arranged to be reciprocated on the shaft as the spools rotate. The speed of reciprocation of the two reels as a unit is controlled to correspond generally to the winding speed of the record member wire so that the wire will be wound relatively level on the receiving reel. In this manner, any tendency for the convolutions of the wire to become entangled or overlaid, is avoided or reduced to a minimum.

In any operation where a filament or thread or, as in this case, a wire, is unwound from a supply spool and wound onto a receiving spool, the problem arises of maintaining substantially uniform tensioning of the filament or wire. If the tension of the magnetic wire is not maintained constant, some slippage might result between the wire and the driving sheave, with consequent result that either the record as electromagnetically recorded in the wire would not correspond to the original signals, or the playback of a properly-made record would not correspond to such record upon reproduction.

According to one phase of the invention, the problem of maintaining constant tension in the wire is solved by a differential drive unit mechanically connected between the two reels in such manner as to establish an automatically self-adjustable driving and reaction force between the two reels to control their relative speeds of rotation. Thus the tension of the wire is the same in the portion coming to the receiving reel as in the portion being at the moment released from the supply reel. Such differential mechanism automatically compensates for the difference in the speed between the layer being unwound from the supply reel and the layer being wound onto the receiving reel.

Another phase of the invention involves a novel limit-indicating and control device which indicates and operates when the end portion of the unreeling part of the wire on the unwinding or supply reel is being approached. That limit device operates to stop the reeling operation in sufficient time before the actual end of the reelable record member or wire is reached and before it is released by the reel from which it is unwound.

*Drive and control arrangement*

Figure 2:
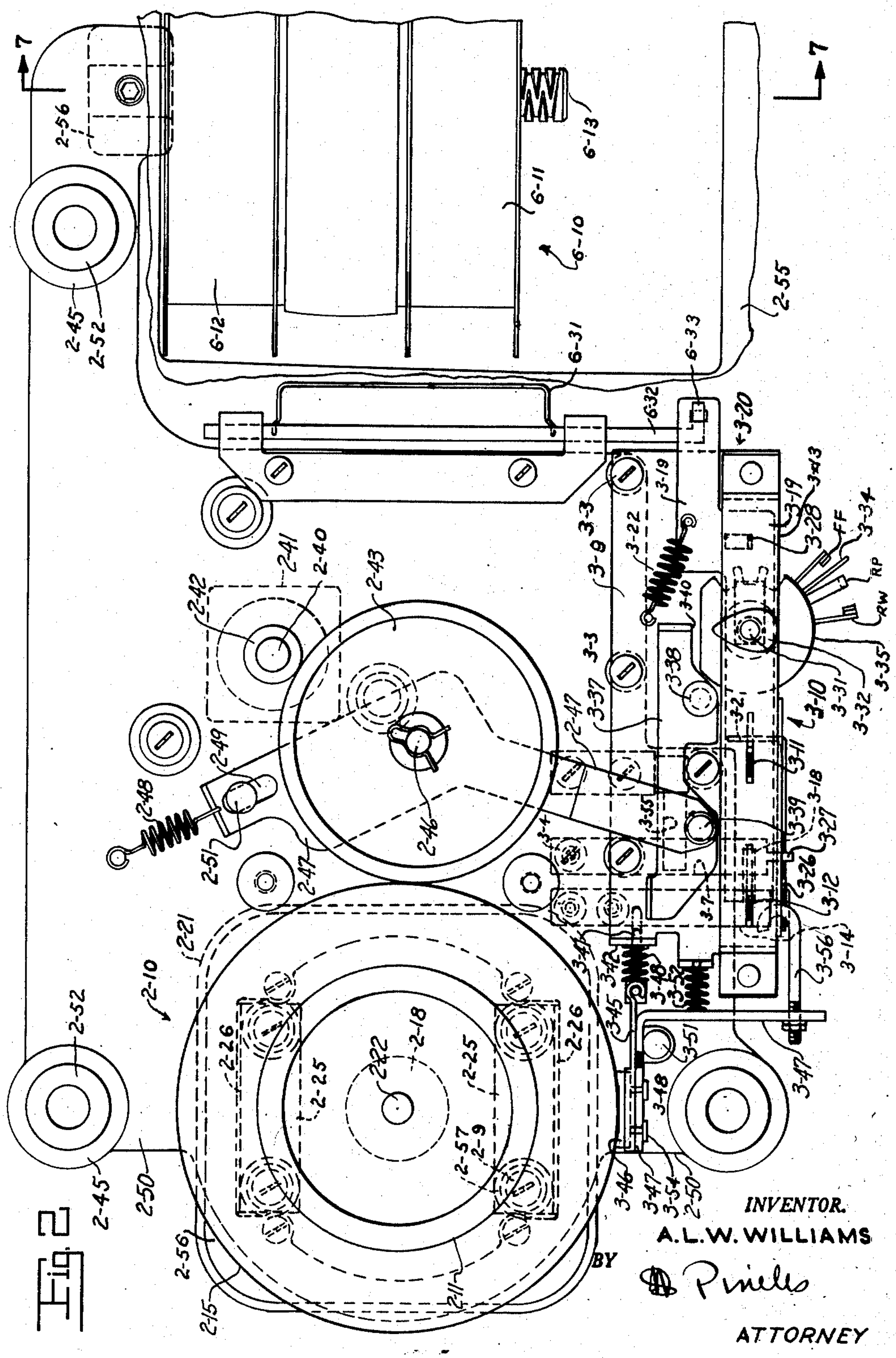
Fig. 2 is a top view of a portion of one form of a practical recording apparatus of the type shown in Fig. 1, parts of the upper structure being broken away to expose parts of the internal mechanism.
Figure 3:
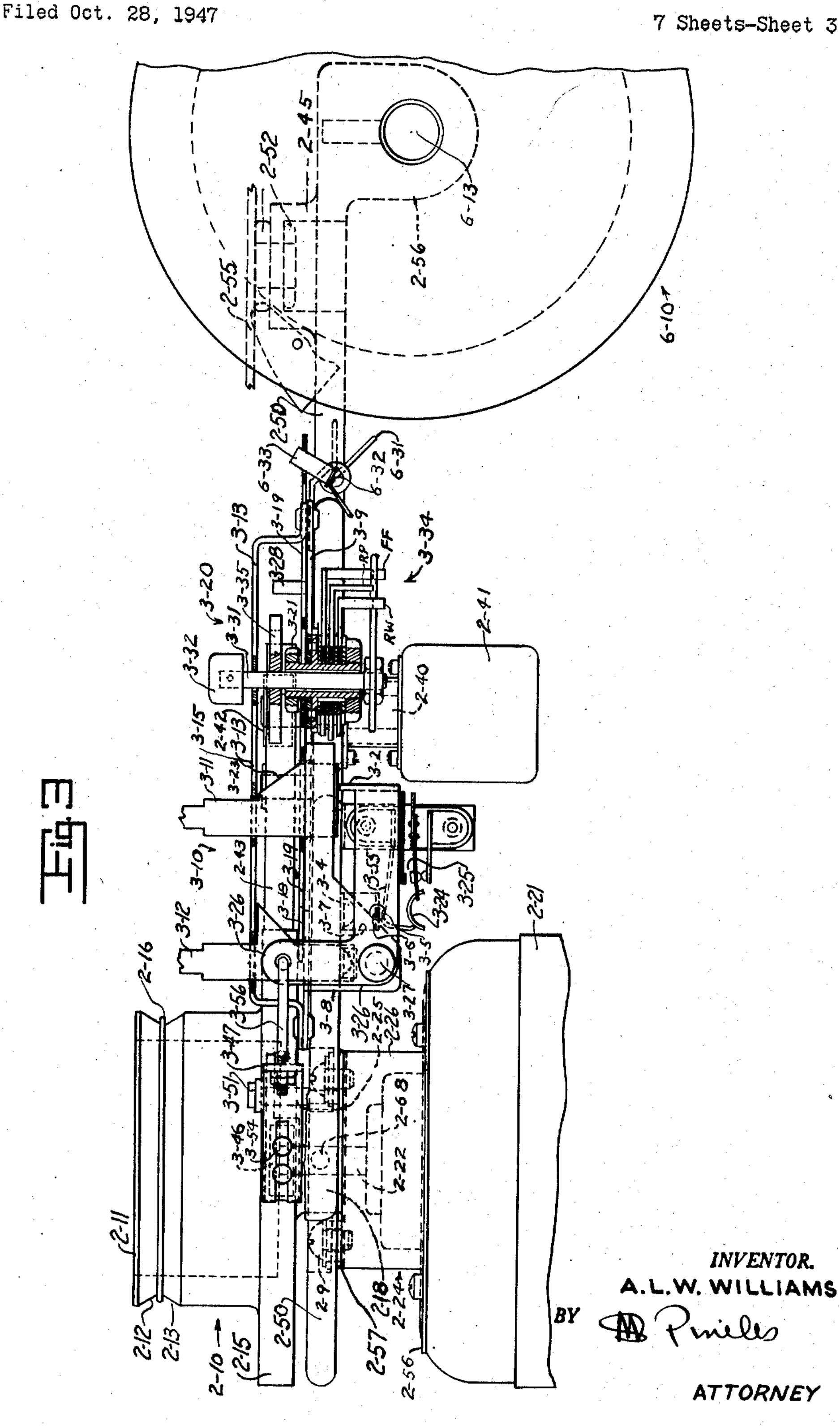
Fig. 3 is a side elevational view of the framework and parts of the mechanism of Fig. 2.

Figs. 1, 2 and 3 illustrate one type of drive and reeling control arrangement based on the principles of the invention. The intermediate or looped portion of the thin magnetic record medium 31 leading from supply reel 6–11 to take-up reel 6–12 is guided over one guide track 2–12 of a revolvably mounted capstan member 2–11 by way of a loop section 31–1 towards a revolvably mounted idler 2–19 and therefrom by way of loop section 31–2 on to another guide track 2–13 of the capstan 2–11 and therefrom to the take-up reel 6–12, in the manner indicated diagrammatically in Fig. 1. The two reels 6–11, 6–12 form part of a reeling mechanism arranged so that the two reels revolve around a shaft 6–13 extending in a direction transverse to the direction of the axis of the capstan 2–11.

In order to secure satisfactory operation of a magnetic recording and reproducing apparatus operating with a reelable, long, thin record member, the reeling mechanism must be so designed as to assure that the record member is at all times maintained under correct and proper tension while in motion as well as at rest. Since the outer convolutions of the record member coils stored on the two reels 6–11, 6–12 must move at the same linear speed with which the tensioned intermediate cross loop is impelled past the record transducing heads 33, 34, the two reels on which the two record member coils revolve, will have the same angular speed only during the relatively short interval while the two record member coils have the same diameter, the two reels moving at different angular speeds under all other operating conditions and the reel with the record member coil of greater diameter revolving at a smaller angular speed than the reel with the coil of smaller diameter.

In the recording arrangement of the invention shown, the two reels 6-11, 6-12 form part of a reeling mechanism 6-10 so arranged that the axis of revolution of the two reels is in a direction substantially transverse or perpendicular to the general direction of a plane extending through the axis of revolution of the capstan 2-11, the capstan being arranged to be driven at a constant speed during a forward reeling operation in order to impel the record member 31 at a constant proper slow speed during a recording or playback operation.

In the recording arrangement shown, the reeling mechanism 6-10 is of a novel type described more fully hereinafter. It is so arranged that the two reels 6-11, 6-12 are interconnected by a reversible motion-transmitting connection which causes the reel from which the record member is unwound to impart to the reel on which the record is wound a motion which assures that the wire is at all times maintained at a proper tension. The reeling mechanism of the type shown in Fig. 1 may also be of the type described in the above-mentioned application.

The capstan or sheave 2-11 drives or impels the wire in a selected direction and is connected to and driven by a high-speed capstan motor 2-21 that is reversible to that the capstan 2-11 may be driven at high speed in either direction as selected by the operator of the apparatus. During forward reeling from supply reel 6-11 to take-up reel 6-12, motor 2-21 drives the capstan in clockwise direction as indicated by arrow F. The high speed in the forward direction is utilized, for example, during playback operation when it is desired to locate some particular portion of the wire that contains the desired recording. When the capstan motor 2-21 rotates in counterclockwise direction, it drives the capstan 2-11 at high speed to rewind the wire from the take-up reel 6-12 back on to the supply reel 6-11.

In order to drive the capstan 2-11 at the required constant slow speed in forward direction for impelling the record member past the heads 33, 34 at a constant slow speed during a recording or playback operation, there is provided an additional slow speed drive motor 2-41 having a shaft 2-40 which drives a capstan 2-42, and capstan 2-42 drives the capstan 2-11 through a filter system including a revolvably-mounted, rubber-tired idler or coupling pulley 2-43 movable into and out of engagement with a flywheel 2-15 which is concentrically affixed and arranged to revolve with the capstan 2-11 and may form an integral part therewith. The idler pulley 2-43 is revolvably mounted at 2-46 on a slider plate 2-47, one arm of which is biased as by a spring 2-48 so as to bring the coupling idler 2-43 from the full-line coupling position shown to the dash-line uncoupling position 2-43-U during a slow forward reeling operation during which the shaft of the slow speed drive motor 2-41 imparts through coupling pulley 2-43 and flywheel 2-15 the desired constant low speed rotation for impelling the recording medium in forward direction during the recording or playback operation. The capstan 2-11 with its flywheel 2-15, the guide idler 2-13 and the two motors 2-21, 2-41 are all revolvably mounted on suitable elements or members of a frame structure 2-50 (Figs. 2 and 3) of the recording apparatus.

The slider plate 2-47 of the coupling pulley 2-43 is mounted for sliding movement along suitable supporting elements of the frame structure. As indicated in Fig. 1, one arm of the slider plate is provided with a guide slot 2-49 slidably engaging a retaining member 2-51 in the form of a shoulder screw or post suitably affixed to the frame structure so as to confine and guide the movement of the coupling pulley 2-43 between its full-line coupling position shown and the dash-line upcoupling position 2-43-U in which it couples the shaft of the slow speed drive motor 2-41 to the flywheel 2-15 of the capstan 2-11 for driving it at the proper low constant speed during a slow forward reeling operation.

The various drive and coupling operations are controlled by the control mechanism generally indicated at 3-10. In the form shown, it comprises a plurality of control members 3-11, 3-12 shown in the form of button-operated push rods. The control members 3-11, 3-12 form part of a mechanism generally similar to a conventional push-button rod control mechanism in which a plurality of button-operated control push rods are arranged to be retained and latched in an inward operated position by a spring or otherwise biased latch bar, a latched control push rod being released from the latched condition whenever any other push rod is actuated to the inward position. Such conventional push-rod control mechanisms are also frequently provided with a release push rod which cannot be latched and is at all times biased to an outward released position, but which serves to release any of the operated latched push rods whenever the released push rod is momentarily actuated to an inward releasing position.

In the control mechanism shown, the two control members 3-11, 3-12 have the form of push rods slidably held and guided in guide walls 3-13 of a mounting structure, each of the push rods being shown provided with suitable biasing means, such as an encircling compression spring 3-14 arranged so as to bias and tend to return its associated push rod to an outward position whenever the push rod has been actuated to an inward position against the opposing biasing forces of its biasing means 3-14. The two push rods 3-11, 3-12 are provided along their inward regions with cam surfaces 3-15, 3-16, respectively, extending through slits 3-17, 3-18 of a latch bar 3-19 slidably mounted in mounting wall portions 3-21 of the mounting structure and biased by biasing means, such as a spring 3-22 for sliding movement in lateral direction so as to retain the push rod 3-11 in an inward latched position when it is pushed in inward direction until the shoulder portion 3-23 of its cam surface passes through its latch bar slit 3-17.

The inclined cam surface 3-15 of the push rod 3-11 is so shaped and its biasing spring 3-14 is so designed in relation to the biasing spring 3-22 of the latch bar 3-19 that—with the push rod 3-11 held in its inward position by latching engagement of its cam shoulder 3-23 with the edge of the latch bar slit 3-17—the latch bar 3-19 is actuated against the action of its biasing spring 3-22 slightly to the right to permit the inclined surface portion 3-15 of the push rod 3-11 to enter the latch bar slit 3-17. The biasing action of the biasing spring 3-14 of the push rod will return the push rod 3-11 to its outward position while its inclined cam surface 3-15 will actuate the latch bar 3-18 to the full-line released position shown.

The other push rod 3-12 of the control mechanism 3-10 has a cam 3-16 so shaped that when it is pushed inwardly the engagement of the cam surface 3-16 with the slot 3-18 of the latch bar will actuate the latch bar to the right and assure that whenever the push rod 3-12 has been actuated to the inward position the Start-On push rod 3-11 is instantaneously released from an inward latched position and permitted to return to the outward released full-line position in which it is shown. The cam surface 3-16 of the stop push rod 3-12 is so shaped that it can never be pushed to an inward position in which it could be latched by the latch bar 3-19.

In the arrangement shown, the Start-On push rod serves to control the operation of a motor-energizing switch 3-25 and a control lever 3-26 shown pivotally mounted at 3-27 whenever the Start-On push rod is actuated from the released outward position shown to an inward operated position in which it is latched by the latch bar 3-19. The switch 3-25 and the control lever 3-26 are shown operated by suitable prongs of the push rod 3-11 and they may be mounted in a conventional way on the substantially rigid mounting structure of the button-operated push rod mechanism.

The push rod control mechanism described above serves to start and to stop all reeling operations whether a slow forward reeling operation or a fast forward or a fast rewind operation, an additional selector mechanism being utilized to selectively set or select the character of the reeling operation.

In the form shown, the selector mechanism, generally designated 3-30, comprises a rotatably mounted shaft 3-31 which is operated by a selector knob 3-32 to one of three different angular operating positions, namely, to positions indicated by the legends FF for fast forward reeling, RP for slow forward reeling during a recording or playback operation, and RW for fast rewind. In the arrangement shown, the selector shaft 3-31 is utilized to operate a three-position switch 3-34 to one of three contact positions corresponding to the three selector positions FF, RP, RW. When the selector knob is in the FF position, the movable contact blade of switch 3-34 connects lead 2-P of the power supply line to one of the three terminals of the fast reeling motor 2-21 so as to prepare an energizing circuit for this motor for causing it to rotate the capstan 2-11 at a high speed in a clockwise forward direction F during a fast forward reeling operation, the energizing circuit to this fast reeling motor 2-21 being completed only when the additional motor energizing switch 3-25 completes the common circuit connection of this motor to the lead 1-P from the power supply terminal of opposite polarity.

When the selector shaft is in position RW, its selector switch 3-34 connects in a similar manner another terminal of the fast reeling motor 2-21 to the power supply lead 2-P for energizing the motor to drive the capstan at a fast speed in counterclockwise direction and performing a fast rewinding operation.

When the selector shaft 3-31 is set in position RP, the selector switch 3-34 connects the power supply lead 2-P to the slow reeling speed motor 2-41 for energizing this motor to drive through coupling pulley 2-43 the flywheel and capstan 2-11 at a required constant low speed in forward direction during a recording or playback operation.

The selector shaft 3-31 is also shown utilized to operate a rotary cam member 3-35 arranged to be turned to three different positions corresponding to the three different settings FF, RP, RW of the selector knob. In the arrangement shown, the selector cam 3-35 is utilized to selectively control the position of the coupling pulley 2-43 and cause it to move and be retained either in the full-line coupling position shown or in the dash-line uncoupling position 2-43-U depending on the position of the selector shaft and its knob 3-32.

In the arrangement shown, the selector cam member 3-35 is provided with a generally circular cam surface having a cut-off surface portion 3-36 and designed for cooperatoin with a facing portion of a coupling lever 3-37 shown pivotally mounted at 3-38 on a fixed element of the frame structure and pivotally connected at 3-39 with the slider plate 2-47 of the coupling pulley 2-43 and arranged so as to selectively actuate to and retain the coupling pulley 2-43 either in the full-line coupled position shown or in the dash-line uncoupling position depending on the setting of the selector cam 3-35.

In the arrangement shown diagrammatically in Fig. 1, this is accomplished by shaping and arranging the cam surface portions of the selector member 3-35 and the cooperating elements of the coupling lever 3-37 and the other elements of the coupling mechanism so that when the selector shaft 3-31 with its knob are in the RP, slow forwarding setting, the cut-off cam section 3-36 of the selector cam 3-35 permits the coupling lever 3-37 to pivot around its pivot 3-38 in upward direction as seen in the figure, thereby permitting the biasing spring 2-48 of the slider member 2-47 to bring and retain the coupling pulley 2-43 in the full-line coupling position in which the slow speed reeling motor 2-41 will drive the flywheel 2-15 and the capstan 2-11 at the proper low constant speed during a forward recording or playback operation; and that upon turning the selector cam 3-35 from the slow reeling RP position shown, either to the fast forward FF or fast rewind RW position, one or the other of the cam surface portions of the cam member 3-35 bordering its cut-off cam portion 3-36, will engage the cooperating portion of the coupling lever 3-37 and turn it around its pivot 3-38 for bringing the slider member 2-47 and the coupling pulley 2-43 from the coupling position shown to the dash-line uncoupling position 2-43-U and retain it therein, and thus break the slow speed driving connection to the capstan as long as the selector cam is either in the FF fast forward or in the RW fast rewind settings.

In the arrangement shown, the selector cam member 3-35 is also utilized to lock the selector mechanism and the elements operated or controlled thereby in either one of its different operating positions as long as the reeling mechanism is in motion and thus prevent damage, such as breaking and entanglement of the wire or any other injury to the reeling mechanism by inadvertent reversal of a reeling operation before first bringing all the critical elements of the mechanism to a stop.

In the arrangement shown, the selector member 3-35 is, to this end, provided with three locking recesses 3-FF, 3-RP, 3-RW corresponding to the three settings of the selector switch and arranged for interlocking engagement with a locking projection or lug 3-28 of the latch bar 3-19, in such manner that whenever the starting push button 3-11 is actuated to an inward operated position, thereby releasing the latch bar 3-19 to a leftward latching position to which it is biased by the spring 3-22, the locking projection 3-28 will enter one or the other of the three cam recesses 3-FF, 3-RP, 3-RW and lock the cam member with the selector mechanism in a given angular setting position as long as the start push rod is in the inward operated position and the latch bar 3-19 is held in its leftward locking position by its biasing spring 3-22.

With a reeling mechanism of the type described above, it is important to assure that a reversal of a reeling operation is rendered impossible before first bringing the moving elements of the reeling mechanism to a stop. Thus, it might be possible for an operator—after first actuating the stop rod 3-12 and releasing the Start-On rod 3-11 to the non-operated position, and thereby returning the latch bar 3-19 to the righthand non-latching position in which it is shown—to turn the selector knob and the selector cam 3-35 from the fast rewind setting RW to a slow forward setting RP, for instance, and immediately actuate the Start-On rod 3-11 to the inward starting position before the rotating elements of the mechanism which were rotating at a high speed were brought to a dead stop. Accordingly, provisions have to be made to prevent a premature reversal of the reeling operation which would result in the breakage of the wire before the rotating elements of the mechanism have been first brought to a dead stop.

In the reeling mechanism of the type shown in Fig. 1, no excessive strain would be imposed on the filamentary record member 31 if a slow reeling operation in forward direction were started before first bringing the capstan to an actual stop. However, if a slow forward operation were started following a fast rewind operation in counter-clockwise direction before bringing the capstan and the other rotating elements of the mechanism to a stop, the filamentary recording medium might be subjected to a strain sufficient to cause it to break.

According to one phase of the invention, a reeling mechanism of a magnetic recording apparatus is combined with means operated by a moving or revolving member of the reeling mechanism for exerting a preventive action preventing a reversal of the direction of the reeling operation as long as one of the moving elements of the reeling mechanism participating in or controlling the reversal of the direction of the reeling motion has been first brought to a stop. In the arrangement shown, the capstan 2-11 with its flywheel 2-15 which is utilized to impart to the recording member 31 a reeling motion in forward direction or in rewinding direction is utilized as the revolving member for operating a locking element which is operative to prevent a reversal of the direction of the reeling motion before it was first brought to a stop.

In the recording arrangement shown, the locking element is formed by a latch rod or bar 3-41 which is suitably guided in guide openings of guide elements 3-42 so as to be movable between the retracted or unlocking position shown and the outward dotted-line position 3-41-L in which it is interposed on the path of a locking lug 3-44 extending from the coupling lever 3-37 so as to lock the coupling lever 3-37 in the dash-line uncoupling position 3-37-U and thus prevent the coupling lever 3-37 from bringing the coupling pulley 2-43 from the uncoupling position to the coupling position, as long as the latch rod 3-41 is interposed in the path of the motion of the locking lug 3-44 of the coupling lever. In accordance with the invention, one or more of generally analogous locking members may be combined with the elements of a reversible reeling mechanism of a magnetic recording apparatus and arranged so that when reversing a reeling operation, the locking member is actuated by the associated revolving element to lock an element of the reversing mechanism and hold it locked until the reeling mechanism is first brought to a stop.

In the recording arrangement shown in Fig. 1, the locking bar 3-31 is shown connected through a link 3-45 to a brake shoe 3-46 having a brake pad arranged to be held by a brake arm 3-47 against the periphery of the capstan flywheel 2-15 whenever the capstan with its flywheel, while rotating in counterclockwise direction, are brought to a stop, so that the frictional engagement between the flywheel which is moving in counterclockwise direction and the brake pad of the brake shoe 3-46 causes it and therethrough the lock bar 3-41 to be moved from the retracted position shown to the latching position against the biasing action of biasing means indicated by a spring 3-48 tending to return the lock bar 3-41 to the retracted full-line position.

As indicated in Fig. 1, the brake lever 3-47 is shown pivotally mounted at 3-51 and biased by a spring 3-52 to press the brake shoe toward the periphery of the flywheel. The brake shoe 3-46 is arranged to be slidably movable along an opening 3-53 of the brake lever, being retained therein by suitable means, such as a shoulder screw or post 3-54 and arranged so that whenever the brake lever 3-47 holds the brake shoe 3-46 in frictional engagement with the flywheel 2-15, the frictional forces imparted by the flywheel rotating in counterclockwise direction will move the brake shoe 2-46 along its guide slot 3-53 in a direction which causes it to actuate the locking bar 3-41 from the retracted position shown to the dash-line locking position 3-41-L against the biasing forces of the retracting spring 3-48.

An additional brake shoe may be provided and arranged to operate through a similar linkage another lock bar whenever the capstan with the flywheel 2-15, while rotating in clockwise direction, are brought to a stop for actuating the brake shoe to impose a similar lock bar in the path of the motion of a similar locking element of the coupling mechanism to prevent a change in the drive coupling connection, or, in general, in the mechanical connections of the driving mechanism incident to the reversal of the driving motion before the capstan with the flywheel, or, in general, the impelling element which impels the record member 31, has been first brought to a stop. However, in the particular recording arrangement shown, it is sufficient to provide only a safeguard against reversal of the driving operation of the type described and shown only under conditions when the capstan with the flywheel rotate at a high speed during a rewinding operation.

In the arrangement shown in Fig. 1, means are also provided to automatically remove from the reeling and driving mechanism all braking forces whenever the normal slow or normal fast forward or rewind operation is performed and to apply the braking forces to quickly stop the reeling operation only when the reeling mechanism is actuated to stop while in motion. In the arrangement shown, this is accomplished by connecting the brake lever 3–47 through a link 3–56 to one arm of the lever 3–26 which is operated by the Start-On control rod 3–11 in such manner that each time the Start-On rod is actuated to the operative position for starting a reeling motion, the brake shoe 3–46 is removed from its braking engagement with the flywheel, and that upon releasing the Start-On control rod 3–11 by the operation of the stop rod 3–12, the biasing spring means 3–52 of the brake arm instantaneously returns the brake shoe into braking engagement with the flywheel for stopping the motion of the capstan.

It should be pointed out in this connection that the main motor-energizing switch 3–25—which is likewise actuated to the operated closed position when the Start-On push rod 3–11 is actuated to the inward operated position—is so arranged that when the Start-On push rod is actuated to the inward operated position, it first removes the braking action of the brake shoe before closing the main motor-energizing switch 3–25, and that on releasing the Start-On push rod, it first opens the motor-energizing switch 3–25 before the brake shoe 3–46 comes into engagement with the flywheel 2–15 for stopping the rotation of the capstan 2–11.

Let it be assumed now that the recording apparatus of Fig. 1 has its selector mechanism 3–30 set by the selector knob 3–32 in the fast rewind position RW. In this condition, a circular raised portion of its selector cam 3–35 will hold the coupling lever 3–37 in the tilted dash-line uncoupling position 3–37–U in which the coupling pulley 2–43 is held in the uncoupling position 2–43–U, and in which the selector switch 3–34 connects the power supply line 2–P to such terminal of the fast speed capstan motor 2–21 as to cause the capstan to be driven in counterclockwise direction when the motor is energized by actuation of the Start-On push rod 3–11 and closure of the main motor energizing switch 3–25 by the Start-On push rod 3–11.

If now the Start-On push rod 3–11 is released by instantaneous actuation of the stop push rod, this will release the latch bar 3–19 from the left-hand latching position and it will return to the full-line unlatching position in which it is shown held by the push rod 3–11 in its released position. The instant the Start-On push rod 3–11 is released, the brake shoe 3–46 will be instantaneously returned by the biasing spring 3–52 of its brake arm 3–47 to the braking position in order to apply to the flywheel 2–15 a braking force for instantaneously stopping its motion. This instantaneous application of the brake shoe 3–46 to the flywheel 2–15 rotating in counterclockwise direction will cause the brake shoe to instantaneously move its latch bar 3–41 into a locking position in which it is interposed across the path of the lock bar 3–44 of the coupling lever 3–37, thereby preventing the coupling pulley 2–43 from being moved from the dash-line uncoupling position 2–43–U to the coupling position, even if the selector cam 3–35—which is now free from its locking engagement with the locking lug 3–28 of the latch bar 3–19—is rotated by the selector knob 3–32 from the fast rewind position RW to the slow forward position RP.

The form of the invention shown in Fig. 1 also safeguards the fragile record track against undue stresses that might be applied when, during a rewinding, the Stop push rod 3–12 is actuated to its inward position, the controls thereby unlocked shifted to the slow forward reeling position RP and the Start push rod 3–11 actuated before the rewinding has come to a halt. This sequence of manipulation is possible with the construction of Fig. 1 but the components are so arranged that the reeling reversal is not affected until after the rewinding has come to a standstill. Thus, the brake shoe of the apparatus shown has a concave face which causes it to move rearwardly away from the flywheel 2–15 and tilt the brake lever 3–47 against the action of spring 3–52 at the same time as the brake shoe is impelled to the right for locking purposes. In other words, the side portions of the shoe which project outwardly towards the face of the flywheel 2–15 further than the central portions of the shoe cause the shoe to move back as it is moved into latching position. The amount of this rearward motion is only about as much as the clearance space provided between the shoe and the flywheel 2–15 when the shoe is retracted by the opertaing lever 3–26 under the control of the Start push rod 3–11. By this arrangement it becomes impossible to have the operating lever 3–26 retract the brake shoe rearwardly away from braking and latching contact with the flywheel 2–15 when the brake shoe is held in the extreme right hand latching position. Accordingly, the actuation of the Start push rod 3–11 before a rewinding has been completely stopped can not withdraw the brake shoe from braking engagement with the flywheel 2–15 and the braking action continues until the flywheel stops rotating thereby permitting the brake shoe retractor 3–48 to withdraw the latch 3–41 from latching position and permitting rearward motion of the brake shoe away from contact with the flywheel.

Without the above action it will be evident that the record track could be seriously overstressed when the rewinding operation is suddenly converted to a forward reeling by actuation of the Start push rod according to the described manipulation.

Other arrangements may also be used for preventing reversal of the record track reeling during the time when the locking lug 3–28 is not in engagement with the cam 3–35. For example, the cam 3–35 may be shaped so as to provide depressions, similar to that shown in 3–36, for receiving the follower nose 3–40 of the coupling lever 3–37 in the control positions for rewinding and fast forward reeling. The additional cam depressions may be separated from the depression 3–36 by barriers extending out from the cam surface for causing the nose 3–40 to prevent rotation of the cam when the coupling lever 3–37 is held in the uncoupled dash-dot position 3–37–U shown in Fig. 1. The latch 3–41 may be formed with twin sliding elements one of which engages below the uncoupled position of the latching ear 3–44 on the coupling lever and prevents its retraction beyond the dash-dot position shown in Fig. 1. In this form of the invention, braking action would also latch the coupling lever either in the coupling full-line position or in the uncoupled dot-dash line position shown and prevent its further downward tilt from either position. The operating cam 3–35 would accordingly be locked during the braking action until reeling is stopped.

Other arrangements for insuring the prevention of record track reversal before complete stoppage include the mounting of the brake latch 3-41 in such position that the Start push rod 3-11 can not be actuated when the latch is ejected as by a braking action. For this method of operation the brake latch 3-41 may merely be arranged to project into the path of an extension of the Start push rod 3-11 whenever braking action is being applied.

In the particular form of recording apparatus shown, the additional safeguards to prevent damage to the recording medium or the mechanism incident to a reversal of the reeling operation are required only when reversing from a fast-rewind to slow-forward reeling operation. Reversal from forward-slow to a fast-rewind operation introduces no difficulties because the flywheel 2-15, in rotating counter-clockwise, will automatically throw the coupling pulley 2-43 from the coupling to the uncoupling position because the speed of the record member is so slow, that the application of the brake incident to the reversal assures stopping of the slow forward reeling before the fast reeling motor 2-21 is energized to effect a fast rewind operation. Reversal from fast forward to fast rewind is likewise without difficulties because the same motor and drive is used and the momentum of the rotating structures, including the flywheel, insures a gradual speed change.

With a magnetic recording apparatus arranged in the manner described above in connection with Fig. 1, a reeling operation may be started at any time from the raised position in which the two button-controlled rods 3-11, 3-12 are held by their biasing springs in their outward released position, by momentarily actuating the Start-On push rod to the inward position wherein it is retained latched by the latch bar 3-19.

Depending on the setting of the selector mechanism 3-30 by means of the selector knob 3-32, the actuation of the Start-On push rod 3-11 to the inward latched position will start and maintain a slow forward reeling operation in the direction of the arrow F when the selector mechanism with its pointer knob 3-32 is set in the RP position; or a fast rewind operation in a direction opposite to the arrow F when the selector mechanism with its selector knob 3-32 is set in the RW position; or a fast forward reeling operation in the direction of the arrow F when the selector mechanism with its knob 3-32 is set in the FF position.

When the Start-On push rod is actuated to the inward operated position with the selector mechanism set in the slow forward reeling position RP, the Start-On push rod 3-11 will actuate its control lever 3-26 to remove the braking action from the capstan flywheel 2-15 and actuate its switch 3-25 to complete the energizing circuit for the slow forward drive motor 2-41 and this motor will drive through the retractible coupling pulley 2-43 and the flywheel 2-15 the capstan at the required low speed in the forward direction F for carrying on either a recording or playback operation depending on the setting of the recording playback switch 41.

When the Start-On push rod 3-11 is actuated to the inward operated position while the selector mechanism is set by selector knob 3-32 in the fast rewind position RW, the operated Start-On push rod 3-11 will actuate its switch 3-25 to energize the fast reeling motor 2-21 to drive the capstan at a high speed in a direction opposite to the direction of the arrow F for rewinding the recording medium at a fast rate on the supply reel 6-11.

When the Start-On push rod 3-11 is actuated to the inward operated position while the selector mechanism is set by knob 3-32 in the fast forward position FF, the operated push rod 3-11 will actuate its switch 3-25 to complete the other energizing circuit of the fast reeling motor 2-21 for driving the capstan 2-11 at a high speed in the forward direction of the arrow F for enabling the user to locate quickly a desired portion of the great length of the recording medium stored in spirally-wound form on the two reels 6-11, 6-12.

As explained above, each time the Start-On push rod 3-11 is actuated to the operated position, it will tend to remove the brake 3-46 from its braking engagement with the flywheel 2-15 of the capstan 2-11. However, any of these reeling operations may be instantaneously stopped by momentary actuation of the Stop push rod 3-12, thereby releasing the Start-On push rod from the inward operated position to the released position, in which it is shown, whereupon the energized motor is cut off from the energy supply by the opening of switch 3-25 and the brake 3-46 is released into braking engagement with the flywheel of capstan 3-11, thereby bringing it quickly and substantially instantaneously to a stop.

In addition, as explained before, a reversal of a reeling operation from fast-rewind to a slow-forward, or a fast-forward reeling operation is subjected to the special interlocking action which prevents the effecting of such reversal of the reeling operation before first bringing the revolving elements of the mechanism to a stop.

The magnetic record transducing apparatus of Fig. 1 is shown provided with mechanical means which operate automatically to stop the reeling operation whenever the end region of a reelable record member stored on the reel from which it is unwound is approached and before the end of the record member is actually reached and released from the reel. This phase of the invention constitutes the subject matter of application Serial No. 732,970, filed March 7, 1947, by A. L. W. Williams.

Another feature of the invention is the added assurance provided against excessive record track tension when reversing any reeling operation. In the form shown in Fig. 1 the brake shoe is so arranged that the braking action applied to stop rotation causes extension of the brake spring 3-48. After the reeling is stopped, the brake shoe is therefore retracted by the return of the extended spring and being still in frictional engagement with the flywheel it will impart a small momentary reversed reeling rotation to the flywheel and the record track. In this manner not only is the reeling stopped slowly but reversal is effected in easy stages. This is especially valuable in shifting from one reeling to a reversed high speed reeling where the sudden acceleration of the record track in reversed direction is particularly severe.

For complete protection the braking arrangement may be made double acting so as to inject an easy reversal stage when reeling in either direction. The brake latch lever 3-45 may for example be held between two oppositely biasing springs so that it follows the flywheel rotation under all braking conditions. Two oppositely directed latch extensions such as the one shown at 3-41 may also be used to prevent control shifting during either type of braking.

The construction of the invention also incorporates additional features. The small reversal of the record track by the brake after being stopped makes it possible to substantially avoid overrunning of portions of the record track. Thus when a dictated message magnetically recorded on the record track is played back, by a typist for example, for the purpose of recording the message with a typewriter, it is necessary to stop and start the slow forward reeling many times. This would ordinarily render parts of the recording unintelligible where the record track is moved at varying speeds during deceleration and acceleration. With the arrangement of the invention, however, the stopping of a transducing will be followed by a reeling reversal sufficient to rewind the record track transduced during the deceleration overrun after the Stop push-rod is actuated. The small reeling speed used also permits the small reversal to return the additional amount of recording that would be rendered unintelligible because of the acceleration of the record track when transducing is resumed. The construction of the invention accordingly enables interrupted playback or recording with substantially no loss of transducing and with a minimum of gaps in the recording. This form of the invention includes a brake control arrangement operating in the direction opposite to that shown in Fig. 1.

In the form shown the limit operation is provided by interconnection between the control elements and the record track holders 6-11, 6-12. These holders contain outwardly biased limit members 6-21 extending through a slot in the wire receiving floor of the reels and adapted to be held down in retracted position by the wire coil on it. Adjacent the reels is mounted a loop arm 6-31 pivotally held on shaft 6-32 as shown and arranged to be held in the path of the pivoted limit members 6-21 when in their extended positions. The shaft 6-32 has an extending crank 6-33 engaging with the slide latch bar 3-19 as shown, so that when the loop arm is rotated from the dash-dot position 6-31-C to the full line position, the slide bar 3-19 is moved a small amount against the holding action of its bias 3-22, enough to disengage the wall of slot 3-17 from the latch ledge, 3-23. The Start-On push rod is thereby permitted to pop out under the urging of its spring 3-14, terminating the reeling action in the manner described above.

With the above interconnection the reeling of the record track is arranged to take place with the limit loop arm 6-31 in the dash-dot position 6-31-C adjacent the reel peripheries as by the linkage with the slide latch plate 3-19 which is brought in the latch position by the bias 3-22 whenever reeling is started. During reeling the limit members 6-21 are held in by the covering turns of wire until the last layer of turns are unwound from the supply reel, when the limit member on this reel is released and extended and the continued rotation of the supply reel causes the extended limit member to engage the loop arm 6-31 and impel it into the full line unlocking position, stopping the reeling. Both reels may have limit members as shown to stop the reeling both in the forward and reverse directions.

The record track may be of the filamentary or tape types. With the tape form of record track it is usually preferred, in Kornei type magnetic record transducers, that the forward reeling be automatically stopped before the record track is completely unwound from the supply reel to avoid the necessity of re-anchoring the end of the record track for rewinding. The limit mechanism may be arranged to permit the record track to completely unwind during the rewinding so that the record track may be more conveniently exchanged for further transducings.

In Figs. 2, 3, 4, and 5 are shown structural details of one practical form of the mechanical elements of a magnetic recording device described in connection with Fig. 1. The various elements of Figs. 2 to 5 are identified by the same numerals as the corresponding parts in Fig. 1. A single frame member 2-50 shown in Figs. 2 and 3, as a frame casting, serves as a support for the driving mechanism 2-10, the control mechanism 3-10 and the reel mechanism 6-10, with the associated motors 2-21, 2-41 and most of the other elements described above in connection with Fig. 1. The frame casting 2-50 is provided on its upper side with the mounting bosses 2-45 through which it is affixed by means of cushioning grommets 2-52 and bolts to the underside of a top or cover panel 2-55, of the apparatus. The reversible capstan drive motor 2-21 is held in its proper position by means of a bracket 2-24 having a base plate portion 2-56 fastened to the motor and horizontal ears 2-25 extending upwardly from the base plate 2-56 on vertically bent walls 2-26.

The ears 2-25 of the bracket 2-24 are secured to the casting frame 2-50 by grommets 2-57, washers, and screws 2-9.

The capstan 2-11 with the flywheel 2-15 is shown in the form of a hollow casting having a hub 2-18 which is secured by a screw 2-68 to the shaft 2-22 of the reversible motor 2-21. The slow forward motor 2-41 is secured in a similar manner to another portion of the underside of the main casting frame, so that its shaft 2-40 projects above it and on the same level as the periphery of the capstan flywheel 2-15. The slider plate member 2-47 is slidably held by retainer screw 2-51 with its pivot connection 3-39 to the control lever 3-37 along the upper side of the casting frame 2-50 in the manner indicated in Fig. 2, so that the idler roller 2-43 may be held by the biasing spring 2-48 either in the uncoupled position or in the coupling position in which it is shown in Fig. 2 as establishing driving coupling engagement between a small roller 2-42 affixed to the shaft 2-40 of slow forward motor 2-41 and the capstan flywheel 2-15.

The control push rods 3-11, 3-12 with their latch bar 3-19 are held as a unit in their operative positions by a frame structure 3-20 including upper frame plate element 3-13 and lower frame element 3-9 having a downwardly extending flange 3-8 suitably secured, as by screws 3-3 or rivets, to upwardly facing supporting elements of the casting frame 2-50, to properly locate the lower elements of the push rod control.

The control shaft 3-31, with its control cam 3-35 and control switch 3-34 is revolvably mounted in vertical position on the control unit frame structure 3-20, so that its cam 3-35 may be rotated from the position in which it is shown in Fig. 2 either to the right or left, where the cam comes into engagement with the facing portion 3-40 of the control lever 3-37 which is pivotally mounted at 3-38 on the base plate 3-9 of the frame structure 3-20 for bringing the idler coupling roller 2-43 to the uncoupling position, when the control lever 3-37 is turned on its pivot 3-38 in counter-clockwise direction by a projecting cam surface portion of the control cam 3–35.

The frame structure 3–20 of the control unit 3–10 also serves as a support for the pivot 3–38 of the control lever 3–37 of the control mechanism.

The brake control lever 3–26 is pivotally mounted on a pivot 3–27 held in a generally horizontal position by the folded edge 3–8 of base plate 3–9, so that when the Start On push rod 3–11 is actuated to the downward operated position, it will engage the projection 3–2 of the brake lever 3–26 and tilt it in clockwise direction, as viewed in Fig. 3 against the restoring forces of a biasing spring 3–52. The biasing spring 3–52 of the brake lever 3–47 is shown in the form of a compression spring, one side of which is connected to and held in position by a lug 3–1 on the base plate 3–9 of the control frame structure 3–20.

The brake shoe 3–46 is slidably retained by shoulder screws 3–54 within elongated holes 3–53 of the supporting arm of the braking lever 3–47, which is pivotally mounted on a pivot post 3–51 held in a generally vertical position on the upper side of the frame casting 2–50.

The base plate 3–9 of the control frame structure 3–20 is provided with a guide lug 3–42 having a guide hole for guiding the latch pin 3–41 which is operated by the brake shoe 3–46 between the unlatched position which is shown to the dotted line latching position when the flywheel 2–15, while rotating in counter-clockwise direction, engages the brake shoe 3–46 and causes it to move along the arm of the brake lever 3–47 from its retracted position 3–41 to the latching position 3–41–L. As explained above, actuation of the latch pin 3–41 by the flywheel 2–15, while it rotates in counter-clockwise direction, will prevent the control lever 3–37 from being returned from an uncoupling position in which it is held during a fast rewinding operation to the coupled position in which it permits the coupling roller 2–43 to be brought to a slow forward coupling position.

In the form of control arrangements shown in Figs. 2 and 3, the clockwise tilting motion imparted to the brake control lever 3–26, each time the Start On push rod is actuated to the inward operated position, is utilized to operate the main motor energizing switch 3–25 from the non-operated position, in which it is shown in Fig. 3, to the upwardly flexed operated position. This is accomplished by providing an overcenter snap switch 3–25 of conventional design which is retained in a non-operated position by a biasing spring 3–24 held wedged between the switch arm and a bent upper end of an actuating arm 3–55. A cantilever spring 3–7, anchored to frame casting 2–50 by screw 3–4, has a free forward end 3–6 which engages a hole 3–5 in the brake control lever arm 3–26, and is so positioned that when the brake control lever 3–26 is tilted clockwise by actuation of the Start On rod 3–11 to the operated position, the cantilever spring 3–7 will be tilted in downward direction, engage the operating arm 3–23 of the switch and actuate it in a downward direction for bringing the switch 3–25 from the downward non-operated position to the upward operated position.

*Indicator mechanism*

Figures 4, 5:
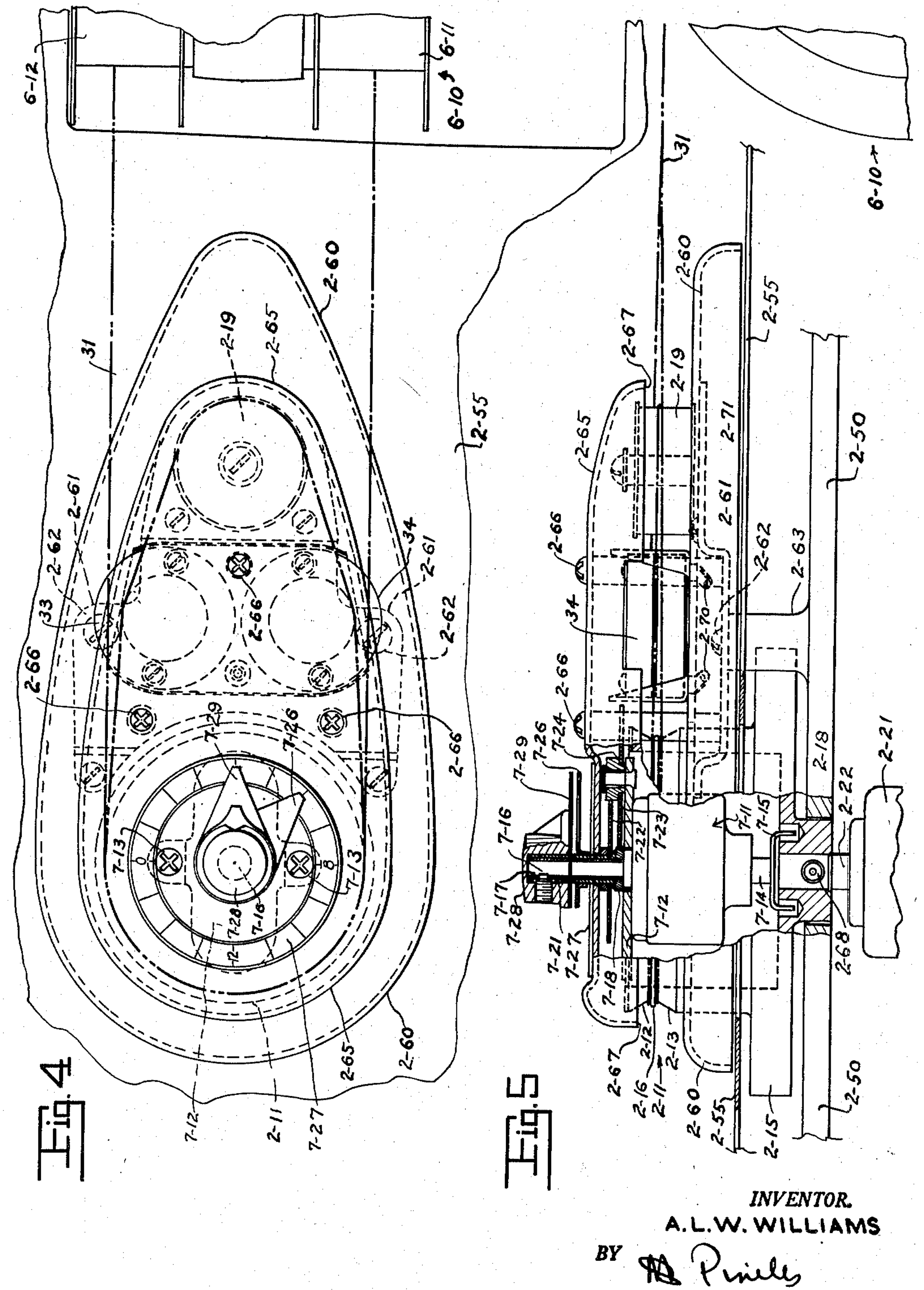
Fig. 4 is a plan view of the exposed top lefthand part of the mechanism of the apparatus shown in Figs. 2, 3.
Fig. 5 is a side elevational view of the part of the mechanism shown in Fig. 4, with some parts shown in cross-section.

Figs. 4 and 5 show an indicator mechanism, generally designated 7–10 which indicates the length of the record member 31 reeled from one reel on to the other reel such as from the supply reel 6–11 on to the take-up reel 6–12. The indicator mechanism is axially mounted directly above the capstan 2–11 and is driven thereby. Since two loops of the filamentary record member 31 pass around the capstan and are at all times in coupling engagement therewith, the number of revolutions of the capstan will give a measure of indication of the length of the record member reeled from one reel on to the other.

The indicator mechanism comprises a speed reducing gear unit 7–11 shown in the form of a circular housing enclosing a train of gears. The speed reducing unit 7–11 is located in the cavity of the capstan 2–11 and the upper wall of its fixed housing is secured as by screws to a mounting bracket 7–12 which is secured, as by screws (not shown), to an apron-like mounting plate 2–60.

The apron-like mounting plate 2–60 has mounted thereon a shaft 2–71 on which the idler puller 2–19 is revolvably mounted. The mounting plate 2–60 has also mounted thereon the erasing head 33 and the record transducing head 34.

The two heads 33, 34 have guide grooves formed along their outwardly facing border regions aligned substantially with the guide grooves 2–12, 2–13 of the capstan 2–11 for properly guiding the looped portion of the filamentary record member 31 around the idler roller 2–19 and past the guide grooves of the two heads and around the capstan guide grooves from and toward the two reels 6–11 and 6–12, respectively. The two heads 33, 34 are held securely in the bracket 2–69, which is fastened to the apron-like mounting plate 2–60 by lugs 2–70.

The hollow capstan 2–11 extends through an opening in the cover or top panel 2–55 of the recording apparatus. The exterior cylindrical periphery of the capstan is provided with two guide track grooves 2–12, 2–13 separated by a partition bead 2–16 for guiding two loops of the filamentary record member 31 as they move in engagement with the capstan, when the record member is impelled by the capstan from one reel on to the other.

The portion of the top panel 2–55 provided with the hole through which the capstan 2–11 projects has also mounted thereon the additional mounting plate 2–60. The mounting plate 2–60 has an apron-like flange and has an opening through which the upper portion of the capstan with its guide grooves 2–12 and 2–13 projects above the level of the mounting plate 2–60 in the way shown in Fig. 5. The mounting plate 2–60 with the elements mounted thereon, as described hereinafter, is held in its operative position as a unit by bridging plate-like bracket member 2–61 which is secured as by screws 2–62 to a mounting boss 2–63 extending upwardly from the frame casting 2–50. There is also provided a smaller, apron-like cover plate 2–65 secured to the bracket member 2–61, by three spacer posts and screws 2–66, the downwardly facing flanges 2–67 of the cover plate 2–65 forming with the upwardly facing surface of the apron plate 2–60 a channel structure covering all elements but exposing the guide grooves of the capstan 2–11 and the two heads 33, 34 as well as idler 2–19 along which the record track 31 is threaded for performing reeling operations.

The high speed driving motor 2–21 is suitably carried on the underside of the main casting 2–50, as indicated in Fig. 5, and the shaft 2–22 of motor 2–21 is secured to the flywheel 2–15 as by a key pin 2–68.

The impelling shaft 7–14 of the speed reducing unit 7–11 is shown connected by coupling prongs 7–15 to the hub of the flywheel 2–15 so that the rotation of the flywheel is transmitted to the impelling shaft 7–14 of the speed reducing unit 7–11 for causing it to drive its upwardly projecting shaft 7–16 at the proper low speed required for indicating on a dial the progress of the recording or plate operation. For instance, in one particular type of magnetic recorder for which the mechanism shown was designed, the speed reduction mechanism was designed to provide for a speed reduction in the ratio from 1 to 3000 so that the low speed shaft 7–16 made one revolution for 3,000 revolutions of the capstan 2–11.

The low speed shaft 7–16 of the speed reducing mechanism extends through a hole of the cover plate 2–65 and drives at its own speed a sleeve 7–17 which is frictionally coupled thereto and is mounted thereon. The sleeve 7–17 carries a pinion 7–18 and has mounted an additional outer sleeve 7–21 carrying a gear 7–22, which is coupled by revolvably mounted intermediary gear unit formed by a gear 7–23 and a pinion 7–24 to the pinion 7–18 of the outer sleeve 7–21, so as to rotate it at a desired lower speed, for instance, in the ratio of 1:60 in order that one revolution thereof should indicate, for instance, one hour of recording time.

A pointer 7–26 of sheet metal, for instance, has a cylindrical hub which is held by a force fit on the outer sleeve 7–21 for indicating on a dial 7–27 suitably affixed, as by cementing, to the underlying outer cover plate 2–65 so that the pointer 7–26 may indicate on the scale the progress of a recording or playback operation.

A knob 7–28, provided with another pointer 7–29, is shown secured by a threaded stud to the inner sleeve 7–17 of the indicator mechanism so that its pointer 7–29 may indicate on another scale the progress of the recording or playback operation in seconds. The knob 7–28 makes it possible to rotate the speed of the frictionally driven inner sleeve 7–17 relatively to its driving shaft 7–16 on the speed reducing mechanism for selectively adjusting the zero setting of the pointer or indicating mechanism.

*Reeling mechanism*

In order to secure satisfactory operation of a magnetic recording and reproducing apparatus, the reeling mechanism must be of such character as to insure that the thin coilable record track is at all times maintained under limited but proper tension while it is reeled from one reel on another. Since the record track convolutions of the coils stored on the two reels must move at the same linear speed at which the cross loop is impelled past the record transducer heads, the outer record track turns on the two reels with the same angular speed only during the short interval while the two record track coils have the same diameter. Under all other operating conditions, the two reels will move at different angular speeds, the reel with the coil of greater diameter revolving at a smaller angular speed than the reel with the coil of smaller diameter.

In accordance with the invention, the foregoing exacting operating conditions essential for the satisfactory operation of a magnetic recording and reproducing mechanism are secured by a novel differential motion transmitting connection or mechanism interconnecting the two reels, with the elimination of brakes, clutches and similar complicated energy consuming elements usually required in prior magnetic recording and reproducing devices.

In accordance with the invention, the differential motion transmitting mechanism is so interconnected between the two reels of the magnetic record transducing device that when the record track is being withdrawn from the supply reel, for instance, and imparts thereto a rotary motion, this supply reel will actuate the differential motion transmitting mechanism so as to transmit therethrough to the take-up reel a rotary motion which causes the take-up reel to reel thereon such a length of the record track as is required in order to maintain the record track at all times under predetermined limited tension, irrespective of the variation of the diameter of the two record track coils stored on the two reels and irrespective of the direction of the reeling operation.

Figure 6:
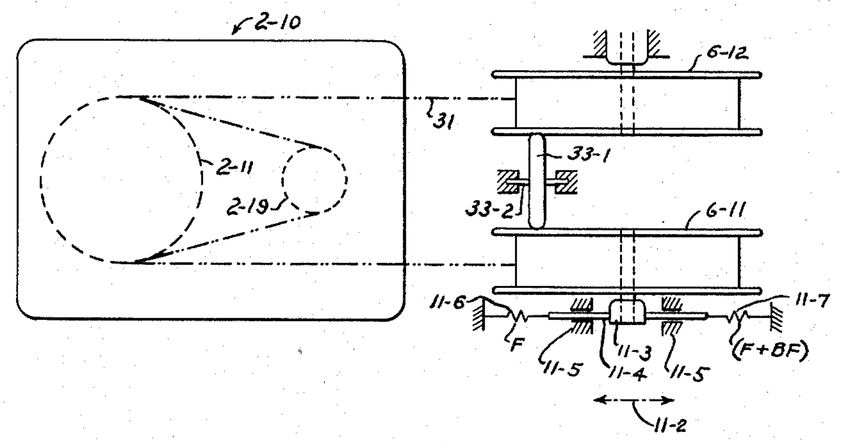
Fig. 6 is a diagrammatic view showing the essential elements of a magnetic record transducer embodying the features of the invention.

The general principles underlying the differential reeling mechanism of the magnetic recording device of the invention are illustrated diagrammatically in Fig. 6, in which the magnetic record track is shown stored on the two revolvably mounted reels 6–11, 6–12 of the magnetic recording record transducing device, having the driving mechanism 2–10 including a revolvably mounted capstan 2–11 for reeling the magnetic track 31 from the supply reel 6–11 onto the take-up reel 6–12, or vice versa.

The two reels 6–11, 6–12 are shown coupled to each other by a roller 33–1 which provides a motion transmitting connection between the two reels of such a nature that when, for instance, one of the reels, as for instance, reel 6–11, rotates, it will transmit its rotation to the roller 33–1, which in turn transmits its rotation to the reel 6–12 for winding thereon a length of the record track 31 corresponding to the length of the track withdrawn from the supply reel 6–11.

In the reeling arrangement of the invention, the two reels 6–11, 6–12 and the motion transmitting coupling roller 33–1 are so arranged and held in such positions as to make it possible to change the ratio at which the rotation of one reel is transmitted to the other reel for automatically compensating for any variations of the relative speed of the two reels and assure that the record track is at all times maintained at a predetermined limited range of tension while the intermediate length of the record track 31 moves at the desired speed along its proper path of the magnetic recording apparatus 2–10.

In Fig. 6 the differential mechanism of the invention is shown diagrammatically in simplified form. The revolvably mounted reel 6–11 is arranged to be slidably moved in the directions indicated by the dash-line arrow 11–2, for instance, by mounting its shaft on a supporting member 11–3, forming part of a slider member 11–4, which is guided by suitable guide elements 11–5 so as to make it possible for the reel to be moved back and forth along the direction of the dash-dot line arrow 11–2. In addition, the slider support 11–4 of the reel 6–11 is shown subjected to the action of two oppositely acting spring forces, namely, a force $(F+BF)$ and an oppositely directed force F so as to cause the record track 31 to be at all times subjected to a predetermined resultant biasing force tension (BF) equal to the difference of the two opposite forces.

The coupling roller 33-1 is shown revolvably mounted on a shaft 33-2 held in fixed position so that the roller revolves at all times in a fixed position.

Assuming now a reeling operation in which, for instance, the record track 31 is reeled from reel 6-12 onto reel 6-11, at a moment when the diameter of the two record track coils stored on the two reels 6-11, 6-12 is of the same diameter, the two reels will, in this condition, move in opposite directions at the same angular velocity, and the coupling roller 33-1 will engage the facing walls of the two reels 6-11, 6-12 at points spaced by an equal radial distance from their axis or center of rotation. When in the course of the further reeling operation the diameter of the coil on reel 6-11 becomes larger than shown, this reel 6-11 will tend to wind thereon a greater length of record track for each revolution thereof than would be unreeled from the other reel 6-12 if they remain in the coupling position shown in Fig. 6. However, the resulting increase in the tension in the record track loop 31 extending between the two reels 6-11, 6-12 will cause the record track 31 to pull the reel 6-11 to the left, as seen in Fig. 6—against the opposing biasing force of spring 11-7—to a position in which the coupling roller 33 engages a differential peripheral region of reel 6-11 of smaller diameter than that shown, for rotating the coupling roller 33-1 and therethrough the other reel 6-12 at a reduced speed and causing the reel 6-12 to unreel therefrom length of the record track just sufficient to assure that the record track is maintained at the desired tension, corresponding to the biasing force BF. The differential coupling connection of the type shown will thus operate automatically to maintain at all times the same tension of the record track 31 throughout the reeling operation, irrespective of the diameter of the record track coils on the two reels and irrespective of the direction of the reeling operation.

One form of a practical construction differential reeling mechanism of the invention will be described by reference to Figs. 7 to 10A.

The reeling mechanism comprises a fixed shaft 6-13 which extends with its forward end in a generally horizontal direction. The rear end of the shaft 6-13 is secured within a mounting hole of a mounting boss 2-56 (Fig. 3) extending from the main frame-casting 2-50, to which all movable elements of the recording or playback mechanism are secured as a unitary assembly. On the shaft 6-13 is slidably seated a mounting sleeve 6-20 (Fig. 7), on which are revolvably mounted two disc-like, reel-supporting members 6-21, 6-22, which carry or support the two reels 6-11, 6-12, in their operative positions.

The drum members 6-21, 6-22, which may be considered as parts of the two reels 6-11, 6-12, respectively, are shown in the form of metal castings, although they may be made of metal stampings. Each drum member 6-21, 6-22 has a seating collar 6-23 arranged to provide a seat for the respective reels 6-11, 6-12. Each of the seating collars 6-23 is provided with a plurality, for instance, three equally spaced, retaining elements, such as a conventional ballsnap unit 6-24 (Fig. 7). Each ballsnap unit 6-24 comprises a flanged cylindrical housing enclosing a ball 6-25 which is biased, as by an inner spring (not shown) against the open end of the housing, so that when a reel, such as 6-12, is pushed onto the seating collar 6-23, the three snapballs 6-24 will be pressed into their housings, until the reel reaches its inward seating position in which they are shown in Fig. 6, whereupon the ball enters a locking hole in the inner reel wall, for releasably locking the reel in its operative seat.

The two reel drums 6-21, 6-22—which may be considered to be the reel structures—are coupled to each other by a differential motion transmitting mechanism based on the principles of the invention, which is so designed that when one reel is rotated for reeling thereon a record track, such as a wire, it will cause the differential mechanism to impart to the other reel a rotary motion of such character as to make sure that the record track or wire is at all times maintained under a predetermined limited tension without overstressing it, notwithstanding the fact that the wire coil, or in general the record track coil which is stored on and rotates with one reel is of a different diameter or thickness than the record track coil which is stored on and rotates with the other reel.

Each of the two coaxially mounted reel drums 6-21, 6-22 is shown provided with a central hub 6-30 in which are seated two bearings 6-31, 6-32 which are shown as ball bearings, and serve as rotary supports by means of which the two reel drums are revolvably supported on the sleeve 6-20. The two reel drums 6-21, 6-22 are shown coupled to each other by a motion transmitting mechanism, generally designated 6-40. This mechanism comprises, as principal parts, a plurality of differential rollers 6-41—in the case shown three in number—arranged so as to engage the toroidally shaped runner portions 6-42 of two generally disc-like members 6-43, 6-44 through which the rollers 6-41 are coupled to the respective reel drums 6-21, 6-22. In general, the toroidally shaped runnerways 6-42 of the two runners provide circular run paths which are coaxial on the reel shaft and which may be turned as great-circle running paths along which the differential rollers are arranged to run, so that when one reel, acting as a supply reel, is rotated by the record track reeled and pulled therefrom, the rollers will transmit to the other reel, which is now operating as a take-up reel, an opposite rotation for reeling thereon a corresponding length of the record track.

The two ball bearings 6-31, 6-32 on which the two reel drums are mounted are the type which will take up radial as well as axial thrust. The inner ball race of ball bearing 6-31 is limited against outward axial movement on its supporting sleeve 6-20 by a resilient split lock ring 6-33 which is snapped into a locking groove of the sleeve 6-20, as shown. The inner ball race of the other bearing 6-32, which is slidably mounted on its mounting sleeve 6-20, is biased in axial direction as by a helical spring 6-34, the outer end of which is held in position by a washer 6-35 which is retained on the sleeve 6-20 by another snap-type lock ring 6-33.

Each of the two circular runner members 6-43, 6-44 is provided with a central hole through which it is floatingly seated on an axial collar portion of the hub member 6-30 of the respective drums, and their outer surfaces are frictionally coupled to the facing disc-like surfaces of the two reel drum members 6-21, 6-22 so as to establish a good driving coupling connection therewith and cause the drum to which it is coupled to rotate if a rotary motion is transmitted thereto by a rotation imparted to the associated runner members 6–43, 6–44, respectively.

Although the two runner members 6–43, 6–44 may be directly coupled to their associated disc-like reel mounting members 6–21, 6–22, they are shown coupled thereto through intermediate sheet coupling members 6–45 which are of a material having good frictional surface characteristics, such as resin impregnated fibre sheet members, which is also effective in damping any irregular jerky motions transmitted through the coupling connection.

Alternatively, the two coupling sheet members 6–45 may be made of a metal such as brass, copper, or the like, which has surfaces through which good driving coupling connection may be established between the two runner members 6–43, 6–44 and the associated reel drum members 6–21, 6–22, respectively.

By this arrangement, the two runner members 6–43, 6–44 are coupled to their respective reel drum members 6–21, 6–22 so as to provide a good traction between them and assure that each runner will be rotating whenever a rotary motion is imparted thereto by the respective reel drum member, and vice versa. For every practical purpose each runner member 6–43, 6–44 may be considered as a fixed part of the reel drum 6–21, 6–22, or their associated reels 6–11, 6–12, respectively.

In the arrangement described above, the biasing compression spring 6–34 exerts through the thrust type ball bearings 6–31, 6–32 axial biasing forces on the two drum members 6–21, 6–22 to assure that they are at all times coupled through their respective runner members 6–43, 6–44 to opposite peripheral portions of each of the coupling rollers 6–41 of the differential drive mechanism, so that when one reel is rotated the several coupling rollers 6–41 will transmit a corresponding opposite rotary motion to the other reel.

Referring to the structural view of Fig. 8 and the diagrammatic views of Figs. 9 to 10A, each of the coupling rollers 6–41 is free to rotate around its axis of rotation 60–1 and also arranged to tilt around a gimbal axis 60–3 extending perpendicular to its axis of rotation 60–1 in a plane which is generally perpendicular to the axis of the two reels or to the reel shaft 6–13. In addition, each of the coupling rollers 6–41 is arranged to be free to shift longitudinally along its axis of rotation 60–1 as well as along its gimbal axis 60–3. Each roller 6–41 has a contact axis, which passes through the two points of peripheral contact engagement of the roller with the opposite runner members 6–43, 6–44 and through the center of the roller in which the two other roller axes 60–1, 60–3 intersect.

In other words, each differential roller 6–41 is mounted for limited axial and free rotary movement with respect to its axis of rotation 60–1 and for limited axial and tilting motion with respect to its gimbal axis 60–3. In addition, two peripheral contact portions of each roller 6–41 along its contact axis engage the runways 6–42 of the two reel structures which are biased into coupling engagement therewith.

In Figs. 7 and 8 is shown one form of roller mounting arrangement which provides for such movable support for each of the three rollers of the mechanism shown. Each of the three rollers 6–41 is rotatably and slidably mounted on a stub shaft 6–46 which represents its axis of rotation 60–1. The roller shaft 6–46 extends from a central portion of a rigid gimbal member 6–47 provided with two shaft ends 6–48 defining its gimbal axis 60–3 around which the plane of the roller 6–41 is arranged to tilt. A spider-like mounting member 6–51 of sheet material has a central collar or hub 6–58 seated on the shaft sleeve 6–20 and serves as a support for the roller gimbals 6–47. The spider member 6–51 is provided with cut-out openings 6–52, each bordered by bearing ears 6–53 bent out therefrom and having holes in which the shaft ends 6–48 of the individual roller gimbals 6–47 are revolvably supported in their proper operative position.

Each gimbal member is free to rotate within its bearing ear 6–53 as well as to shift longitudinally therein. As indicated in Fig. 8, a spring clip 6–54 is placed on one of the shaft ends of each gimbal member after its shaft ends have been inserted into their bearing ears 6–53 so as to limit the axial movement of the gimbals and retain them in their operative positions. The sheet portions of the spider member 6–51 extending along the outer periphery of the several gimbal mounting openings 6–52 are provided with outwardly bent gate portions 6–55 provided with a hole 6–56 into which a rear extension 6–49 of the roller shaft projects so as to limit the angular range over which the gimbal member 6–47 with its roller 6–41 may be tilted around the gimbal axis.

With this arrangement each roller gimbal 6–47 is free to oscillate over a limited angular range around the gimbal axis, each gimbal and its roller being also free to shift longitudinally along the gimbal axis over a limited range. In addition, each roller 6–41 is free to rotate around its shaft 6–46 and to shift axially along it within the range defined by the gimbal support of shaft 6–46 and by the border portion of the spider opening 6–52 extending in front of the roller shaft 6–46.

The several roller gimbals are arranged to cooperate with a common force balancing mechanism, one form of which is shown in Figs. 7 and 8. It comprises a junction plate 6–61, of sheet metal, having a central circular seating opening the central hub 6–58 of the spider member 6–51.

The junction plate member 6–61 is provided with pivot pins 6–67 on which are pivotally mounted balancing levers 6–71, one for each roller gimbal, through which balancing forces are transmitted to the gimbal members 6–47 of the several coupling rollers 6–41.

Each balancing lever 6–71 is shown formed of sheet metal and has a forked arm end 6–72 straddling with its two prongs and engaging with its intermediate edge portion the periphery of a balancing collar 6–63. The other arm of the balancing lever 6–71 has a flat finger 6–73 engaging one shaft end 6–48 of the associated gimbal member. To provide for lateral floating movement of the balancing collar 6–63, its central opening is made of greater diameter than that of the spider hub 6–58. In other words, the three levers 6–71 provide balancing connections between the central balancing collar 6–63 and one shaft end of each gimbal member 6–47 and of the several differential rollers 6–41.

The junction plate 3–61 is retained in its axial position on the collar by a suitable retainer element, such as the inwardly bent ends 6–64 of a bale-like spring member 6–65, the ends of which are sprung into holes of the hub member 6–58, as indicated in Fig. 8. As shown in Fig. 8, the triangular junction plate 6–61 is provided with an arm extension 6–68 which is connected through a tension type biasing spring 6–69 to a set screw 6–66 held in a lock projection of the spider member 6–51 for providing an adjustably settable biasing force which urges the arm 6–73 of each balancing lever against the facing shaft end of the associated gimbal member 6–47.

The balancing interconnection between the central balancing collar 6–63 and the gimbal members 6–47 of the several differential rollers is so designed that when a differential roller 6–41 with its associated gimbal member 6–47 is moved longitudinally along its gimbal axis it will transmit through the associated balancing lever 6–71 a balancing motion to the gimbal members of the other differential rollers 6–41 until all forces acting on the balancing collar 6–63 are balanced.

The spider member 6–51 is restrained against rotation on its shaft sleeve 6–20 but has a free limited axial movement thereon. In the arrangement shown, rotation of the spider structure is restrained by connecting to one of its peripheral ear portions 6–57, as by a screw post 6–75, a link member 6–76 through which it is connected to the frame structure of the apparatus. The link member 6–76 is shown formed by a strip of metal having a hole engaging a portion of the screw post 6–75 and permitting limited angular movement of the spider within the longitudinal hole of the link member 6–76. In addition, the post 6–75 is shown as having connected thereto a biasing spring 6–77 which likewise extends from the frame structure, and exerts on the spider a biasing action which tends to shift each of the differential rollers angularly along its circumferential path on the runner surfaces 6–42, away from its neutral position.

The function of the differential mechanism, including the rollers and the two runnerways, is to automatically drive the collecting or take-up reel at such speed that will make the tension of the wire coming onto the take-up reel equal to the tension of the wire leaving the supply reel. To accomplish such equalization, the speed of the take-up reel is varied from one which is above supply-reel speed to one which is below supply-reel speed, according to the relations between the thickness or diameter of the two reel coils as they vary during a reeling operation between a maximum and a minimum.

The differential mechanism thus functions as an overdrive or as a speed-reducer, and adjusts itself automatically, as may be necessary, to control the speed of the take-up reel and the torque impressed thereon, thereby to control and limit the tension of the wire loop extending between the two reels.

*Operation of the differential mechanism*

Referring to Figs. 7, 8 and 9, let it be assumed that the differential rollers 6–41 are momentarily in the neutral position in which they are shown in Figs. 7 and 9, and that the record track 31 is reeled from the lefthand supply reel 6–11, as seen in Fig. 7, so that it moves out of the plane of the drawing and is reeled back toward the plane of the drawing on to the righthand take-up reel 6–12, which is being rotated by the differential rollers 6–41 in counter-clockwise direction, the driving forces being imparted to the differential rollers 6–41 by the rotation of the supply reel 6–11 in clockwise direction when seen coaxially aligned with the reel 6–12 on Fig. 8.

Furthermore, let it also be assumed that at the given moment the diameter or the thickness of the reel coil of the lefthand supply reel 6–11 is greater than the thickness of the reel coil on the take-up reel 6–12 so that one full turn of the supply reel 6–11 unreels a greater length of record track than is reeled on to the take-up reel 6–12 during one complete turn thereof, thereby loosening the cross-overloop of the record track 31 extending between the two reels.

As seen in Fig. 8 each of the differential rollers is subjected to circumferential biasing forces tending to shift it along its gimbal axis. These biasing forces which may be designated as gimbal bias forces are shown supplied by the biasing spring 6–69 which transmits its biasing forces through the three biasing or balancing levers 6–71 to one shaft end 6–68 of each roller gimbal 6–47.

In the absence of the gimbal bias forces, the differential rollers 6–41 would, if retained in the neutral position in which they are shown in Figs. 7 and 9, keep the two opposite peripheral contact portions along the contact axis 60–3 of each roller in engagement with the toroidal runways 6–42 at points of the same radius relatively the axis of reel shaft 6–13, in which position the clockwise rotation imparted by the unreeled record track 31 to the supply reel 6–11 will cause it to rotate the differential rollers 6–41 and drive therethrough the take-up reel 6–12, at the same angular speed in counter-clockwise direction.

However, the differential reeling mechanism of the invention described above will operate to cause each differential roller to be automatically tilted around its gimbal axis 60–3 to an angular position in which its contact axis 60–3 will be displaced from the neutral position in which it is shown in Fig. 9 by a proper angle 60–4, thereby changing the ratio of the motion transmission connection between the two reels so that each clockwise turn of the supply reel 6–11 causes the take-up reel to be turned sufficiently more than one turn until speed conditions are established at which the take-up reel will reel thereon the full length of the record track withdrawn from the supply reel 6–11 and will keep the record track or wire at a predetermined limited tension correlated to the biasing forces exerted on the differential rollers by the gimbal biasing forces, such as exerted by the biasing spring 6–69 on balancing levers 6–71.

This automatic operation may be explained as follows:

Assuming the initial conditions given above—with the differential rollers in the neutral position shown in Figs. 9 and 10, and the runways of the two reels rotating in opposite direction for reeling the record track from supply reel 6–12 to the take-up reel 6–11—the biasing action of the biasing spring 6–69 will be transmitted by the spider 6–51 with the junction plate and balancing levers 6–71 to the several roller gimbals 6–47 and will subject each roller to biasing forces tending to shift it along its gimbal axis, in the direction 60–B shown in Fig. 10.

The record track in unwinding from reel 6–12 imparts a rotary pull to this reel as shown by the arrow 6–F of Fig. 10 and the reel 6–12 in turn impels the rollers 6–41 for transmission of rotary winding forces to the take-up reel 6–11. The force applied to the roller by reel 6–12 will be directed somewhat out of the plane 60-3 of the roller as shown exaggerated at 60-RF in Fig. 10 and will have a diagonal component 6-F-1 as shown in Fig. 9 due to the interaction with the biasing force 60-B and the resulting tendency to move the roller axis 60-1 away from exact radial position with respect to the reels. The component 6-F-1 tends to tilt the roller plane 60-3 to the position shown at 60-T in which the supply reel 6-12 tends to drive the take-up reel 6-11 at a lower speed. Accordingly, the record track will be unwound from supply reel 6-12 at a speed which tends to be less than that at which it is coiled onto the take-up reel. Tension will therefore, appear in the reeled record track and will cause the take-up reel to directly drive the supply reel through the tensioned record track thereby tending to let the rollers float idly between the reels and decreasing the size of the tilting force 6-F-1. It is apparent therefore that the roller bias 6-69 is balanced against the record track tension and variation of the bias will permit adjustment of the record track tension as desired.

When the record track is reeled in the reverse direction from reel 6-11 to reel 6-12 as indicated by the arrow 6-R in Fig. 10-A a similar interplay of forces will cause the appearance of a similar diagonal component 60-RR tending to tilt the roller plane 60-3 in the opposite direction to also cause the unwinding to take place at a speed lower than the take-up.

The tilting bias imparted to the rollers 6-41 is accordingly so directed that no matter in which direction the reeling is effected, the record track will be maintained suitably tensioned. Furthermore, the correct tilting bias will be maintained no matter what angle of tilt the rollers happen to find themselves in because of the different amounts of record track held on the reels and the different effective reel diameters that result. It is apparent therefore that the operation is similar to that explained in connection with the form of the invention shown in Fig. 6.

In other words, the longitudinal shifting of the differential rollers along the gimbal axis over the toroidal coupling runways of the two reels, subjects the contact portions of each roller to a couple of radial tilting forces which bring them to a more or less tilted position, in which the reel which at the given moment acts as a supply reel transmits rotary motion to the other reel acting as a take-up reel at such speed ratio as to cause the two reels to impart to the reeled record track or wire tensioning forces which react through the reels on the differential rollers so as to counter-balance the biasing forces impressed thereon by the external biasing spring 6-69.

With the differential reeling arrangement of the invention, the differential rollers will automatically adjust their angular position of tilt around the gimbal axis 60-2 in such way as to automatically establish and vary the proper speed ratio between the reel from which the record track is unwound and the reel on which the record track is wound and maintain operating conditions which assure that the cross-overloop of the record track is at all times maintained under the predetermined limited tension.

By combining with the differential roller arrangement of the type described above force balancing elements interconnecting the gimbal, or, in general, the mounting elements of the several rollers, assurance is provided that all rollers are subjected to the balanced forces, while they transmit the motion of the supply reel to a take-up reel throughout the required range of the variations of the angular speed of the two reels as determined by the variations of the diameter of the two reel coils.

The gimbal forces transmitted to the individual rollers are at all times balanced, since each lever 6-71 has a balancing arm 6-72 engaging the floating balancing collar 6-73 so as to automatically keep the biasing forces exerted on the several gimbals 6-47 balanced. Should one or another of the differential rollers be subjected by the runways to any excessive forces, this balancing interconnection between the rollers will automatically operate to equalize the forces to which the several rollers are subjected.

In accordance with the invention, a differential reel mechanism of the type shown in Figs. 6, 7 and 8 is also combined with means for causing the reels to be reciprocated on the reel shaft 6-13 at a rate correlated to the reeling operation in order to assure that a thin filament or wire record track 31 is substantially uniform or level wound in successive layers along the reel on which it is reeled.

In the level wind arrangement of the invention, the ball bearing on which one of the reels revolves on the hollow sleeve shaft 6-20 of the differential reel mechanism, is utilized as a part of the speed reducing mechanism which transforms the rotary motion of the reel into a required slow reciprocatory level wind motion imparted to the hollow sleeve shaft 6-20 relatively to the fixed reel shaft 6-13 on which the reel mechanism is mounted.

In the form of level wind arrangement shown, the reel shaft 6-13 is provided with an endless cross-thread 8-11. The groove of the cross-thread 8-11 is engaged by a finger of a pawl 8-12 which is retained in position by a collar 8-13 seated for slidable and rotatable movement on the reel shaft 6-13. The collar 8-13 is encircled by a coupling sleeve 8-14 of metal which has an outer portion encircling the collar and coupled thereto as by one or more spring tongue portions 8-16 thereof, engaging holes formed in the outer surface of the collar, so that a rotation imparted to the sleeve 8-14 will be also imparted to the collar 8-13 and its pawl 8-12. Biasing means, such as a helical compression spring 8-17, interposed between the pawl 8-12 and the encircling portion of the sleeve 8-14 maintain the pawl finger in engagement with a groove of the cross-thread 8-11. The coupling sleeve 8-14 is also provided with a cage section 8-21 providing a cage for the balls of the adjacent ball bearing 6-31 by means of which the mounting member 6-21 of one of the reels is revolvably supported on the hollow sleeve shaft 6-20 which is slidably mounted on the reel shaft 6-13.

The ball race cage 8-21 of the coupling sleeve 8-14 provides a speed-reducing motion-transmitting connection between reel 6-11 and the pawl collar 8-13 which is coupled to the cross-thread of the fixed shaft 6-13, whereby the rotation of the reel 6-11 with its reel mounting member 6-21 on its hollow shaft sleeve 6-20 causes the ball races of the ball bearing 6-31 to rotate the balls and ball cage 8-21 of this bearing and the collar 8-13 at a reduced rate. The reduced rotary speed imparted to the collar 8-13 is transformed by its pawl coupling with the cross-thread of the fixed shaft into a slow reciprocatory motion between the fixed shaft 6-13 and the sleeve 6-20 with the differential reel mechanism carried thereby, for assuring that the reels are reciprocated at the required rate at which a filamentary record track is substantially level wound on to the take-up reel.

In operation, when the reel 6-11 with its reel drum 6-21 is rotated during a reeling operation, the outer race of its ball bearing 6-31 will rotate the row of balls of the ball bearing 6-31 and the ball cage 8-21 thereof at a reduced rate of speed determined by the ratio of the diameter of the individual balls and the diameter of the ball races engaged thereby. This reduced speed of the ball cage of ball bearing 6-31 is in turn imparted to the pawl collar 8-13 and the pawl 8-12 for transforming the rotary motion into a proper slow reciprocatory motion along the cross-thread 8-11 of the reel shaft for reciprocating the sleeve shaft 6-20 of the double-reel reel mechanism into the required level wind reciprocatory motion.

In the level wind mechanism described above, the inner ball race of ball bearing 6-31 may be considered as a fixed ball race. A mechanism including a rotating outer ball race of a ball bearing, such as ball bearing 6-31, cooperating with an inner fixed ball race of such ball bearing and a set of balls running between them will operate as a speed reducing mechanism which will impart to a cage, such as cage 8-21 of the ball race of the ball bearing, a reduced speed corresponding to the ratio of the diameter of the inwardly facing race surface of the outer ball race which is engaged by the ball, and also the diameter at which the inner race engages the balls and the diameter of the balls.

In general, a ball bearing arrangement of the type shown will provide a speed reduction between the outer ball race and the ball cage which causes the ball cage to move at a speed of about 70% of the outer ball race. By changing the inclination of the faces of the ball race and the size of the balls, any desired speed reduction may be obtained up to a ratio of about 2:1.

With the above construction the reciprocation of the reel assembly on the cross shaft 6-13 permits the record track held in a relatively fixed level of travel around the capstan 2-11 to wind up in level turns of layers on the take-up reel and prevents snarling or entanglement. If desired additional record track guides may be provided for assisting in the level winding. Thus the relatively fixed level of record track travel to and from the capstan may be further defined by additional fixed supports close to the reel structure 6-10 engaging the record tracks and assuring the constancy of their paths while the reel assembly oscillates. Alternatively the reel assembly may be held stationary and guides provided engaging the record tracks and oscillating them axially of the reels for winding in level layers.

Although a detailed analytical explanation of the reeling operation of the device of the invention has been given above, it is not intended that applicant be bound thereby. Further analytical developments may show that the actual explanation is different in fact. Actual constructions have proven however that the apparatus constructed in accordance with Figs. 7, 8, and 8A does exhibit all the reeling functions described and is very practical and compact.

The reeling arrangements of Figs. 6 to 8A are not restricted to use in combination with the control arrangement of Figs. 1 to 5 but may be used with any other control and/or impelling systems as desired. Thus for example the apparatus of Fig. 7 may be combined with an impeller directly driving one of the reels 6-11, 6-12 such as the one being used as a take-up for receiving the reeled record track. The impeller may be arranged to directly drive this reel at a rotational speed varying in accordance with the amount of record track wound on it so as to impart a constant linear speed to the record track. Alternatively the reeling drive may be applied to only one reel impelled in opposite directions for the corresponding reeling operations. The record track need not be impelled at a constant speed during transducing operations. The record track speed may be permitted to vary in which case the speed variation should be reproducible so that the playback will be an exact copy of the recording. Thus for example the record track holder acting as a take-up reel may be directly impelled for winding the record track and moving it along the guide path as by mounting it on an extended motor shaft. Due to the varying effective diameter of the impelled reel, as the record track continues to coil up on it the linear record track speed increases even with constant rotational impelling speed. However if the rotational speed of the reel is reproducible, e. g. constant, the variations in linear record track speed are also substantially reproducible and each element of the track will be impelled past the transducing head at substantially identical speeds during recording and playback.

In other words, in the same manner as the biasing force BF exerted on reel 6-11 of the reeling mechanism of Fig. 6 causes the take-up reel to be driven by differential roller 33-1 at a speed at which the record track is under a tension which balances the biasing force BF, the tilting biasing force exerted by the biasing spring 6-69 on the three differential rollers 6-41 of the reeling mechanism of Figs. 7 and 8 tilts them automatically to angular position at which the take-up reel is driven by the differential rollers 6-41 at a speed at which the record track is maintained at a tension which balances the biasing forces exerted by the biasing spring 6-69.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. A transport mechanism for a transducing device having an elongated magnetizable record member having two ends comprising: a pair of reels for holding said record member, each reel including an annular grooved runner portion, means rotatably mounting said two reels in coaxial side-by-side spaced apart relationship with said two runner portions facing each other, the two ends of the record member each secured to a different reel with the bulk of the record member held in coiled form on the reels and with an intermediate portion of the record member extending between the reels, a base, driving means mounted on said base engaging said intermediate portion of the record member for driving said record member, direct motion transmission means between said reels including at least one revolvable differential roller engaging the two grooved runner portions of said two reels for causing rotation of one reel by said record member to rotate the differential roller(s)

and to thereby cause rotation of the other reel, a spider mounting member positioned between said reels, means rotatably and pivotally connecting said differential roller(s) to said spider member for pivot motion and for rotation with respect to said spider about an axis normally perpendicular to the axis of said reels, and means connected to said base and to said spider member to prevent substantial rotation of said spider member with respect to said base.

2. A transport mechanism as set forth in claim 1, further characterized by the said means which secure the differential roller(s) to said spider member for pivot motion and for rotation with respect to said spider about an axis normally perpendicular to the axis of said reels, also permits translatory motion of said differential roller(s) in directions parallel to the planes of said reels.

3. A transport mechanism as set forth in claim 2, further characterized by spring means connected to said spider mounting member and connected to said at least one revolvable differential roller to bias said roller(s) with respect to said annular grooved runner portions to effect said translatory motion to establish a tensional force in said record member while said mechanism is operating.

4. A transport mechanism as set forth in claim 3, further characterized by said means rotatably mounting said two reels including an endlessly threaded shaft, means mounting said shaft on said base, and bearing means connected to said pair of reels and in engagement with said endless thread for axially reciprocating said two reels on said shaft for level winding said record member on said reels.

5. A transport mechanism as set forth in claim 3, further characterized by said means connected to said base and to said spider member including means to permit a limited amount of rotation less than a substantial amount upon reversal of the direction of motion of the record member with respect to said reels.

ALFRED L. W. WILLIAMS.

References Cited in the file of this patent

UNITED STATES PATENTS

| Number | Name | Date |
|---|---|---|
| 681,145 | Spacke | Aug. 20, 1901 |
| 1,175,677 | Barnes | Mar. 14, 1916 |
| 1,414,941 | Gill | May 2, 1922 |
| 1,981,370 | Mowat | Nov. 20, 1934 |
| 2,157,259 | Delaval et al. | May 9, 1939 |
| 2,231,279 | Miron | Feb. 11, 1941 |
| 2,477,146 | Scherbatskoy | July 26, 1949 |

FOREIGN PATENTS

| Number | Country | Date |
|---|---|---|
| 313,672 | Great Britain | June 20, 1929 |
| 70,496 | Norway | May 27, 1946 |